(12) United States Patent
Idicheria et al.

(10) Patent No.: US 10,605,222 B2
(45) Date of Patent: Mar. 31, 2020

(54) INTERNAL COMBUSTION ENGINE AND METHOD OF IGNITING A FUEL

(71) Applicant: GM Global Technology Operations LLC, Detroit, MI (US)

(72) Inventors: Cherian A. Idicheria, Novi, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/077,271

(22) PCT Filed: Mar. 31, 2016

(86) PCT No.: PCT/US2016/025158
§ 371 (c)(1),
(2) Date: Aug. 10, 2018

(87) PCT Pub. No.: WO2017/171776
PCT Pub. Date: Oct. 5, 2017

(65) Prior Publication Data
US 2019/0032623 A1  Jan. 31, 2019

(51) Int. Cl.
*F02P 9/00* (2006.01)
*F02D 41/00* (2006.01)
(Continued)

(52) U.S. Cl.
CPC .............. *F02P 9/007* (2013.01); *F02D 37/02* (2013.01); *F02D 41/0002* (2013.01);
(Continued)

(58) Field of Classification Search
CPC ...... F02D 13/02; F02D 13/0265; F02D 37/02; F02D 41/00; F02D 41/0002;
(Continued)

(56) References Cited

U.S. PATENT DOCUMENTS 6,286,482 B1 *  9/2001  Flynn ........................ F02B 1/12
                                                    123/25 C
2009/0126684 A1 *  5/2009  Shiraishi ............. F02D 41/3041
                                                    123/406.12
(Continued)

OTHER PUBLICATIONS

International Search Report and Written Opinion issued in International Application No. PCT/US2016/025158, dated Dec. 28, 2016.

*Primary Examiner* — John Kwon
*Assistant Examiner* — Johnny H Hoang
(74) *Attorney, Agent, or Firm* — Quinn IP Law

(57) ABSTRACT

An internal combustion engine includes a fuel nozzle for injecting a fuel into a combustion chamber, and a plasma igniter for generating one or more pluralities of free radicals within the chamber, and initiating a flame to ignite the fuel. The igniter protrudes into the chamber. A method of igniting a fuel within a combustion chamber and controlling combustion phasing includes injecting a first portion of the fuel into the combustion chamber, energizing the plasma igniter to generate one or more pluralities of free radicals, each plurality having a known voltage, subsequently injecting a second portion of the fuel into the combustion chamber, and closely coupling activation of the plasma igniter with the second injection to ignite the fuel. Combustion phasing of the ignition event is controlled by controlling the number and voltage of the pluralities of free radicals generated by the plasma igniter.

20 Claims, 6 Drawing Sheets

(51) Int. Cl.
    *F02P 5/04*     (2006.01)
    *H01T 13/50*     (2006.01)
    *F02P 15/08*     (2006.01)
    *F02D 37/02*     (2006.01)
    *F02M 26/01*     (2016.01)
    *H01T 13/20*     (2006.01)
    *F02D 41/40*     (2006.01)
    *F02P 23/04*     (2006.01)
    *F02P 5/00*     (2006.01)
    *F02P 21/00*     (2006.01)
    *H05H 1/24*     (2006.01)
    *F02B 75/12*     (2006.01)
    *F02D 13/02*     (2006.01)
    *F02D 41/38*     (2006.01)

(52) U.S. Cl.
CPC ......... F02D 41/006 (2013.01); F02D 41/402 (2013.01); F02M 26/01 (2016.02); F02P 5/00 (2013.01); F02P 5/045 (2013.01); F02P 15/08 (2013.01); F02P 21/00 (2013.01); F02P 23/04 (2013.01); H01T 13/20 (2013.01); H01T 13/50 (2013.01); H05H 1/2406 (2013.01); *F02B 2075/125* (2013.01); *F02D 13/0219* (2013.01); *F02D 13/0265* (2013.01); *F02D 2041/001* (2013.01); *F02D 2041/389* (2013.01); *H05H 2001/2418* (2013.01); *H05H 2001/2431* (2013.01)

(58) Field of Classification Search
CPC ...... F02D 41/006; F02D 41/40; F02D 41/402; F02P 5/00; F02P 5/045; F02P 21/00; F02P 23/04; H05H 1/24; H05H 1/2406; H05H 2001/2431; H05H 2001/2418; H01T 13/20; H01T 13/50; F02B 17/00; F02B 17/005; F02B 2023/085
See application file for complete search history.

(56) References Cited

U.S. PATENT DOCUMENTS

| | | | |
|---|---|---|---|
| 2009/0151322 A1* | 6/2009 | Coates | F01N 3/0275 60/275 |
| 2010/0175655 A1* | 7/2010 | Lykowski | H01T 13/50 123/169 R |
| 2010/0212620 A1 | 8/2010 | Shimizu | |
| 2012/0199088 A1 | 8/2012 | Burrows et al. | |
| 2015/0252757 A1 | 9/2015 | McAlister | |
| 2015/0377206 A1 | 12/2015 | Idicheria | |
| 2016/0069305 A1* | 3/2016 | Ito | F02M 35/10281 123/472 |
| 2016/0069320 A1* | 3/2016 | Idicheria | F02D 13/0261 123/298 |
| 2017/0298894 A1* | 10/2017 | Idicheria | F02D 41/30 |
| 2018/0340507 A1* | 11/2018 | Idicheria | F02B 1/06 |
| 2018/0347476 A1* | 12/2018 | Idicheria | F02D 41/0057 |

* cited by examiner

INTERNAL COMBUSTION ENGINE AND METHOD OF IGNITING A FUEL

TECHNICAL FIELD

The disclosure relates to an internal combustion engine and to a method of igniting a fuel and controlling combustion phasing.

BACKGROUND

Vehicles may be powered by an internal combustion engine. During operation of the internal combustion engine, a heat source may ignite a fuel within a combustion chamber to combust the fuel and provide power to the vehicle. Such ignition may occur hundreds of times per second during specific operating modes of the internal combustion engine.

SUMMARY

A first method of igniting a fuel within a combustion chamber defined by a cylinder block of an internal combustion engine includes injecting a first portion of the fuel into the combustion chamber, and, after injecting the first portion, energizing the plasma igniter to generate a first plurality of free radicals. After generating the first plurality of free radicals a second portion of the fuel is injected into the combustion chamber, and, after injecting the second portion, the plasma igniter is activated to thereby ignite the fuel. The plasma igniter extends through a cylinder head mated to the cylinder block and protrudes into the combustion chamber, and is configured such that energizing the plasma igniter generates a plurality of free radicals within the combustion chamber, and activating the plasma igniter initiates a flame within the combustion chamber to ignite the fuel in the chamber. After generating the first plurality of free radicals and prior to injecting the second portion, the plasma igniter can be de-energized and subsequently re-energized one or more times to generate additional pluralities of free radicals, which can include generating a second plurality, third plurality and at least a fourth plurality of free radicals.

A second method of igniting a fuel within a combustion chamber defined by a cylinder block of an internal combustion engine includes energizing the plasma igniter to generate a first plurality of free radicals within the combustion chamber, then de-energizing and subsequently re-energizing the plasma igniter to generate a second plurality of free radicals. After generating the second plurality of free radicals, a first portion of the fuel is injected into the combustion chamber, and subsequently a second portion of the fuel is injected into the combustion chamber. After injecting, the plasma igniter is activated to thereby ignite the fuel.

An internal combustion engine including a cylinder block defining a combustion chamber therein, a cylinder head mated to the cylinder block such that the cylinder head covers the combustion chamber, a fuel nozzle configured for injecting a fuel into the combustion chamber, and a plasma igniter extending through the cylinder head and protruding into the combustion chamber is provided. The plasma igniter configured for generating a plurality of free radicals within the combustion chamber when energized, and for initiating a flame for igniting the fuel within the combustion chamber when activated. The engine is configured for igniting the fuel within the combustion chamber using at least one of the methods described herein. In one example, the plasma igniter is a corona discharge plasma igniter configured for discharging a plasma having a plurality of streamers into the combustion chamber. In another example, the plasma igniter is a dielectric-barrier-discharge plasma igniter configured for discharging a plasma having a plurality of streamers propagating along the surface of the firing portion of the dielectric-barrier-discharge plasma igniter and into the combustion chamber. The engine is further configured to control combustion phasing by controlling energizing of the plasma igniter to selectively generate an electrical field having a voltage between 10 kV and 80 kV, at a frequency between 60 Hz and 10 MHz, for a duration between 0.1 milliseconds (ms) and 5.0 ms. The engine is further configured to selectively control the energizing and de-energizing of the plasma igniter such that a first plurality of free radicals can be generated when a crankshaft attached to the piston is at a first rotational position, and a second plurality of free radicals can be generated when the crankshaft attached to the piston is at a second rotational position. In one example, the rotational difference between the first and second rotational positions is between 20 degrees and 150 degrees. The engine is further configured to control combustion phasing of the engine, for example, by using a controller to selectively energize the plasma igniter to generate subsequent pluralities of free radicals including the second plurality of free radicals, such that combustion phasing is advanced as the number of pluralities of free radicals generated for an ignition event is increased, and/or to selectively energize the plasma igniter to generate an electrical field having a predetermined voltage, wherein advancement of the combustion phasing is defined by and increases with increases in the predetermined voltage.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire range. Each value within a range and the endpoints of a range are all disclosed as separate embodiments. The terms "comprising," "comprises," "includes," "including," "has," and "having" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
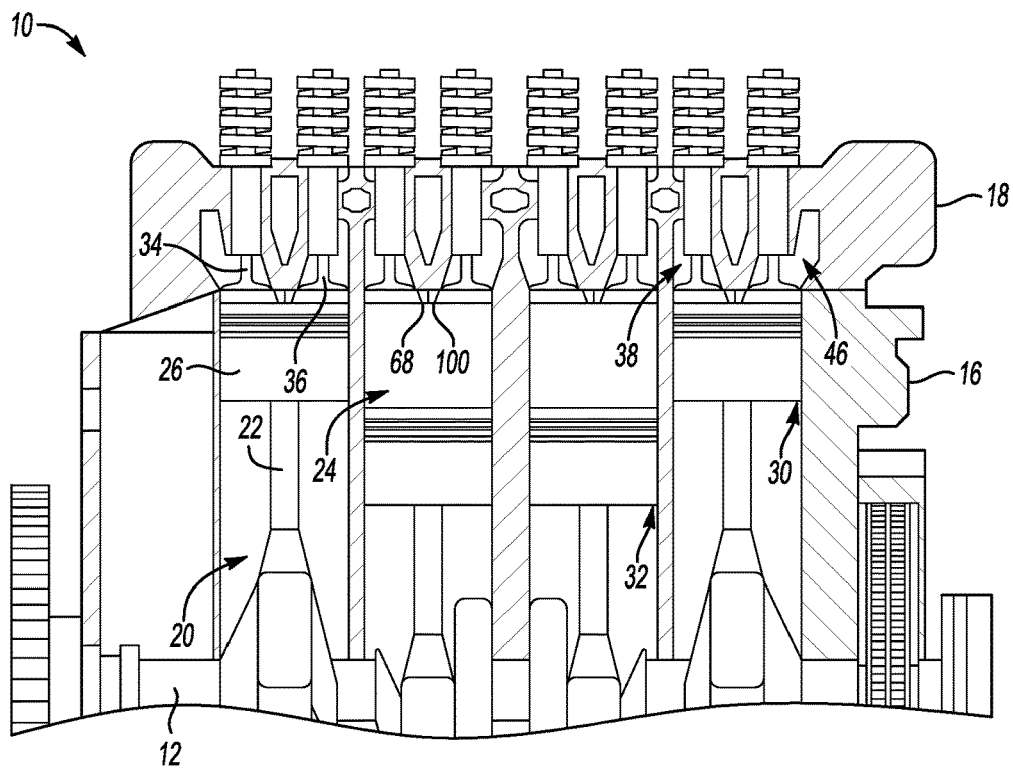
FIG. 1 is a schematic illustration of a cross-sectional fragmentary view of an internal combustion engine, wherein the internal combustion engine defines a plurality of combustion chambers, a plurality of intake ports, and a plurality of exhaust ports.

Referring to the Figures, wherein like reference numerals refer to like elements, an internal combustion engine 10 for a vehicle is shown generally in FIG. 1. The internal combustion engine 10 may be useful for automotive applications, such as passenger sedans, sport utility vehicles, or trucks. However, the internal combustion engine 10 may also be useful for non-automotive applications, such as for industrial vehicles, recreational vehicles, or power generation.

As described with reference to FIG. 1, the internal combustion engine 10 may be operably connected to a plurality of wheels (not shown) disposed on one or more axles (not shown) of the vehicle to provide power for translating the vehicle along a surface. For example, the internal combustion engine 10 may be connected to a crankshaft 12 and transmission (not shown) which may in turn rotate the one or more axles. The internal combustion engine 10 may provide direct motive power to the plurality of wheels, such as via the crankshaft 12 connected to the one or more axles, or may provide power to one or more electric motors (not shown) and/or batteries (not shown), which may in turn provide direct motive power to the plurality of wheels. Regardless, the internal combustion engine 10 may be configured for providing power to the vehicle by combusting a fuel 14 (FIGS. 2 and 9) and converting chemical energy to mechanical energy.

With continued reference to FIG. 1, the internal combustion engine 10 includes a cylinder block 16 and a cylinder head 18 mated to the cylinder block 16. For example, the internal combustion engine 10 may include a head gasket (not shown) configured to sealingly mate the cylinder head 18 to the cylinder block 16. The cylinder block 16 defines a cylinder bore 20 therein that is shaped for housing a piston 22. For example, the cylinder block 16 may define four, six, eight, or twelve cylinder bores 20 therein, and the internal combustion engine 10 may therefore be respectively characterized as a 4-cylinder, 6-cylinder, 8-cylinder, or 12-cylinder internal combustion engine 10. Alternatively, the cylinder block 16 may define one, two, three, or five cylinder bores 20 therein, and the internal combustion engine 10 may therefore be respectively characterized as a 1-cylinder, 2-cylinder, 3-cylinder, or 5-cylinder internal combustion engine 10.

In addition, the cylinder block 16 defines a combustion chamber 24 therein disposed between the piston 22 and the cylinder head 18. More specifically, the cylinder head 18 is mated to the cylinder block 16 such that the cylinder head 18 covers the combustion chamber 24.

Generally, as shown in FIG. 1, the internal combustion engine 10 may include the same number of pistons 22 as cylinder bores 20 so that one piston 22 is disposed within each cylinder bore 20 and is attached to the crankshaft 12. Each piston 22 may include a piston head 26 that is sized to slideably translate within the cylinder bore 20. Therefore, the piston head 26 may alternately translate towards and away from the cylinder head 18 to thereby rotate the crankshaft 12 through a plurality of rotational positions 28 (FIGS. 5 and 14), measured in angular degrees of rotation, so that the internal combustion engine 10 may convert linear motion of the piston 22 into rotational motion.

Referring again to FIG. 1, each of the plurality of pistons 22 is configured for reciprocating within a respective one of the cylinder bores 20 between a first position (shown generally at 30) and a second position (shown generally at 32) to thereby collectively intake and displace a quantity of air from the internal combustion engine 10. For example, the first position 30 may be characterized as "top dead center" and may refer to a position at which the piston head 26 is disposed farthest away from the crankshaft 12 and the crankshaft 12 has a rotational position 28 (FIGS. 5 and 14) of 0 degrees. Similarly, the second position 32 may be characterized as "bottom dead center" and may refer to a position at which the piston head 26 is disposed closest to the crankshaft 12 and the crankshaft 12 has a rotational position 28 of 180 degrees. Therefore, as the plurality of pistons 22 reciprocate within the plurality of cylinder bores 20 between the first position 30 and the second position 32, the internal combustion engine 10 may "breathe" to intake and displace the quantity of air.

Figure 2:
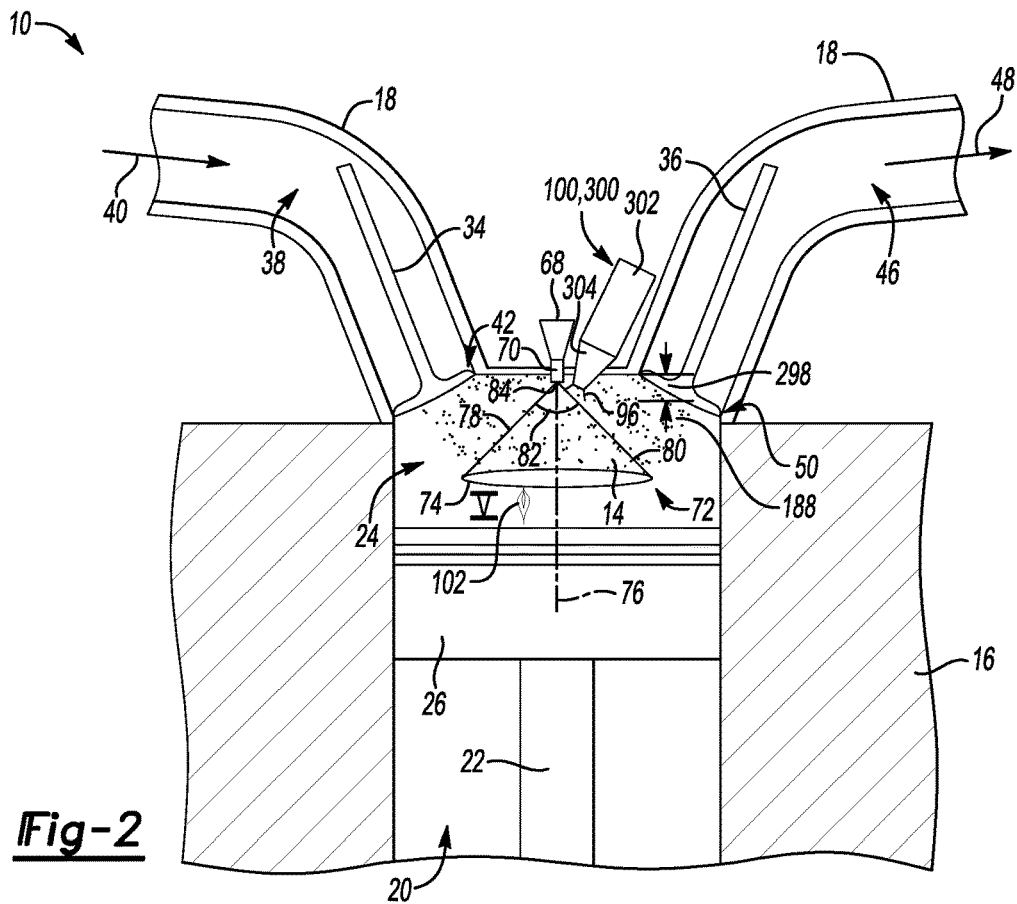
FIG. 2 is a schematic illustration of a cross-sectional view of one of the plurality of combustion chambers, a respective one of the plurality of intake ports, and a respective one of the plurality of exhaust ports of FIG. 1, wherein a plasma igniter protrudes into the combustion chamber and is configured as a corona plasma discharge igniter.
Figure 9:
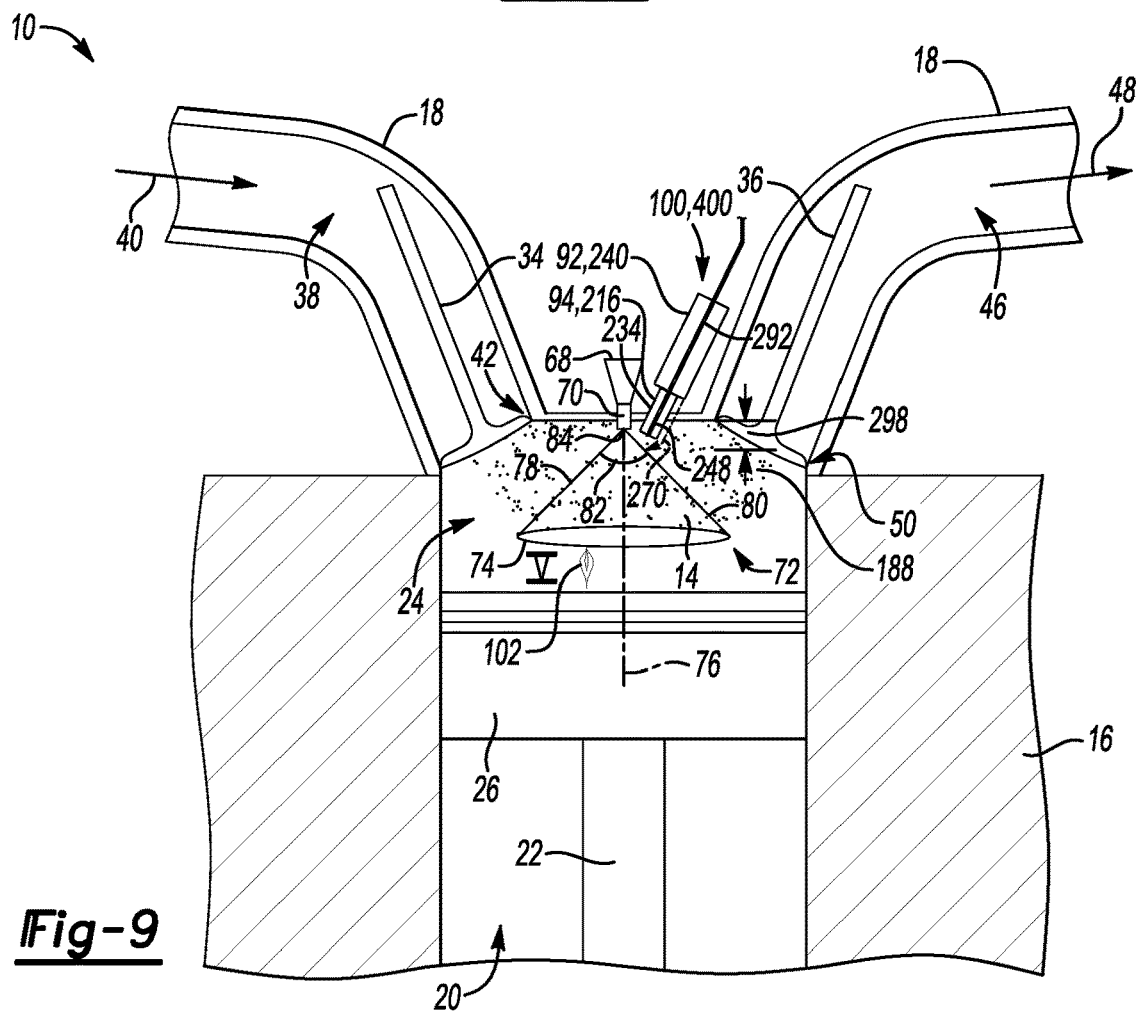
FIG. 9 is a schematic illustration of a cross-sectional view of one of the plurality of combustion chambers, a respective one of the plurality of intake ports, and a respective one of the plurality of exhaust ports of FIG. 1, wherein a plasma igniter protrudes into the combustion chamber and is configured as a dielectric-barrier-discharge plasma igniter.

Referring now to FIGS. 2 and 9, to optimize combustion of the fuel 14 within the combustion chamber 24, the internal combustion engine 10 may also include an intake valve 34 and an exhaust valve 36. That is, the cylinder head 18 defines an intake port or runner 38 therein that is disposable in fluid communication with the combustion chamber 24, and the intake valve 34 may be disposed within the intake port 38. The intake port or runner 38 may be arranged to feed intake air (represented generally by arrow 40) into the combustion chamber 24 during operation of the internal combustion engine 10.

As such, the intake valve 34 may be configured for alternatingly allowing and preventing fluid communication between the intake port 38 and the combustion chamber 24. For example, during operation of the internal combustion engine 10, the intake valve 34 may transition from a seated position 42 (FIGS. 2, 5, 9 and 14) in which the intake port 38 and the combustion chamber 24 are not disposed in fluid communication, to an unseated position 44 (FIGS. 5 and 14) in which the intake port 38 and the combustion chamber 24 are disposed in fluid communication to thereby allow intake air 40 into the combustion chamber 24. Conversely, the intake valve 34 may transition from the unseated position 44 to the seated position 42 to thereby prevent intake air 40 from entering the combustion chamber 24. In one non-limiting embodiment, the internal combustion engine 10 includes two intake valves 34 per each combustion chamber 24. In other non-limiting embodiments, the internal combustion engine 10 may include one intake valve 34 or three intake valves 34 per combustion chamber 24.

Similarly, referring again to FIGS. 2 and 9, the cylinder head 18 may define an exhaust port or runner 46 therein disposable in fluid communication with the combustion chamber 24, and the exhaust valve 36 may be disposed within the exhaust port 46. The exhaust port or runner 46 may be arranged to transmit exhaust gas (represented generally by arrow 48) from the combustion chamber 24 during operation of the internal combustion engine 10. The exhaust port or runner 46 may also enable exhaust gas 48 re-breathing or re-induction.

As such, the exhaust valve 36 may be configured for alternatingly allowing and preventing fluid communication between the exhaust port 46 and the combustion chamber 24. For example, during operation of the internal combustion engine 10, the exhaust valve 36 may transition from a closed position 50 (FIGS. 2, 5, 9 and 14) in which the combustion chamber 24 and the exhaust port 46 are not disposed in fluid communication to an open position 52 (FIGS. 5 and 14) in which the combustion chamber 24 and the exhaust port 46 are disposed in fluid communication to thereby allow exhaust gas 48 to drain from the combustion chamber 24. Conversely, the intake valve 34 may transition from the open position 52 to the closed position 50 to thereby prevent exhaust gas 48 from exiting the combustion chamber 24. In one non-limiting embodiment, the internal combustion engine 10 includes two exhaust valves 36 per combustion chamber 24. In other non-limiting embodiments, the internal combustion engine 10 may include one exhaust valve 36 or three exhaust valves 36 per combustion chamber 24.

Figure 5:
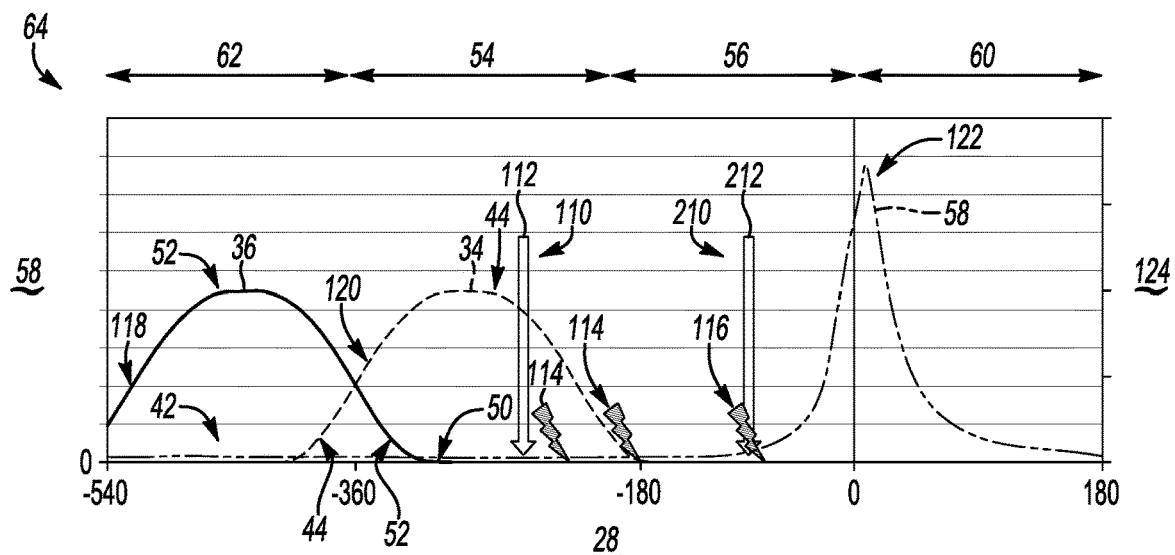
FIG. 5 is a schematic illustration of a relationship between pressure within a combustion chamber of FIG. 1 as measured in kilo Pascals (kPa), valve lift within the intake port and the exhaust port of FIG. 1 as measured in millimeters (mm), and a rotational position of a piston disposed within the combustion chamber during a first example operating condition of the internal combustion engine of FIG. 1 as measured in angular degrees, according to the first example method shown in FIG. 4.
Figure 14:
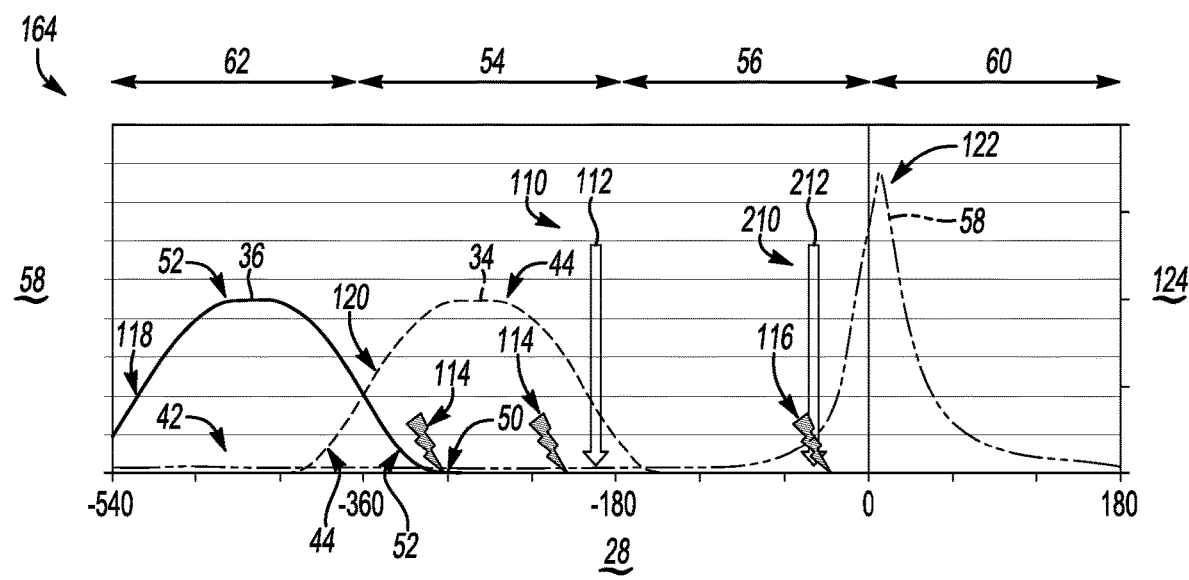
FIG. 14 is a schematic illustration of a relationship between pressure within a combustion chamber of FIG. 1 as measured in kPa, valve lift within the intake port and the exhaust port of FIG. 1 as measured in mm, and a rotational position of a piston disposed within the combustion chamber during a second example operating condition of the internal combustion engine of FIG. 1 as measured in angular degrees, according to the second example method shown in FIG. 13.

Referring now to FIGS. 5 and 14, during operation of the internal combustion engine 10, the piston 22 may cycle within the cylinder bore 20 via an intake stroke 54, a compression stroke 56, an expansion stroke 60, and an exhaust stroke 62 during a combustion cycle. In particular, during the intake stroke 54, the piston 22 may travel from the first position 30 (FIG. 1) to the second position 32 (FIG. 1) within the combustion chamber 24. Therefore, if the intake valve 34 is disposed in the unseated position 44, intake air 40 may be drawn into the combustion chamber 24 as the piston head 26 travels towards the crankshaft 12.

Subsequently, during the compression stroke 56, the piston 22 may travel from the second position 32 (FIG. 1) to the first position 30 (FIG. 1) within the combustion chamber 24. Therefore, if the intake valve 34 is disposed in the seated position 42 and the exhaust valve 36 is disposed in the closed position 50, the piston 22 may compress the intake air 40 and increase the pressure 58 (FIGS. 5 and 14) within the combustion chamber 24.

Next, during the expansion stroke 60, the piston 22 may travel from the first position 30 (FIG. 1) to the second position 32 (FIG. 1) within the combustion chamber 24. For example, as the fuel 14 is combusted after the compression stroke 56, the resulting pressure 58 (FIGS. 5 and 14) from combustion may push against the piston head 26 and the piston 22 may travel to the second position 32.

Finally, during the exhaust stroke 62, the piston 22 may travel from the second position 32 (FIG. 1) to the first position 30 (FIG. 1) within the combustion chamber 24. Therefore, if the intake valve 34 is disposed in the seated position 42 and the exhaust valve 36 is disposed in the open position 52, the exhaust gas 48 may be removed from the combustion chamber 24 via the exhaust port 46.

The internal combustion engine 10 may also operate under several valve protocols. For example, referring to FIGS. 5 and 14, the internal combustion engine 10 may operate under a positive valve overlap (PVO) valve protocol 64 in which both the intake valve 34 and the exhaust valve 36 are concurrently disposed in the unseated position 44 and the open position 52, respectively, for one or more rotational positions 28 of the crankshaft 12. That is, the intake valve 34 may be disposed in the unseated position 44, i.e., may have a positive valve lift 124, while the exhaust valve 36 is also disposed in the open position 52 for a specified rotational position 28 of the crankshaft 12, as set forth in more detail below. An overall duration of the PVO valve protocol 64 may vary. That is, the internal combustion engine 10 may operate under the PVO valve protocol 64 during operation of the engine.

Conversely, the internal combustion engine 10 may operate under a negative valve overlap (NVO) valve protocol (not shown) in which the intake valve 34 is never disposed in the unseated position 44 while the exhaust valve 36 is disposed in the open position 52 for any rotational position 28 of the crankshaft 12. Rather, during the NVO valve protocol, the intake valve 34 is always disposed in the seated position 42, i.e., has zero valve lift 124, while the exhaust valve 36 is disposed in the open position 52, and the exhaust valve 36 is always disposed in the closed position 50 while the intake valve 34 is disposed in the unseated position 44. An overall duration of the NVO valve protocol may also vary. That is, the internal combustion engine 10 may operate under the NVO valve protocol during operation of the engine. The examples are illustrative and non-limiting, and similar strategies such as variable valve timing or varying of cam phasing can be employed to achieve varying amounts of NVO and PVO overlap during engine operation.

The internal combustion engine 10 may also operate under several combustion conditions. For example, the internal combustion engine 10 may operate under a stoichiometric combustion condition in which air 40 and the fuel 14 are combined in a stoichiometric ratio within the combustion chamber 24. Alternatively, the internal combustion engine 10 may operate under a lean combustion condition in which air 40 and the fuel 14 are not combined in a stoichiometric ratio within the combustion chamber 24. Lean combustion conditions include conditions in which the fuel 14 is diluted with air 40 and/or exhaust gas 48 within the combustion chamber 24 and may be characterized as lean-stratified combustion, homogeneous charge compression ignition (HCCI) combustion, spark-assisted compression ignition, or lean homogeneous combustion. In one embodiment, the internal combustion engine 10 may operate as a downsize boosted dilute combustion engine in which the internal combustion engine 10 includes a reduced number of cylinder bores 20 and combustion chambers 24 and includes a boosting device such as a turbocharger or supercharger.

Referring again to FIGS. 2 and 9, the internal combustion engine 10 also includes a fuel nozzle 68 configured for injecting the fuel 14 (shown schematically as a cone as one non-limiting example) into the combustion chamber 24. The fuel 14 may be any composition such as, but not limited to, gasoline, ethanol, diesel, natural gas, and combinations thereof. The fuel nozzle 68 may have an end valve 70 configured for ejecting the fuel 14 and may extend through the cylinder head 18 into the combustion chamber 24. The end valve 70 may define a plurality of holes (not shown) through which the fuel 14 may be ejected. A portion of the fuel 14 ejected through one of the plurality of holes may be referenced as a fuel plume 72. Therefore, the fuel 14 injected into the combustion chamber 24 by the fuel nozzle 68 may include one or more fuel plumes 72. Generally, the fuel nozzle 68 may be arranged to deliver the fuel 14 to the combustion chamber 24 in a shape and quantity according to desired combustion characteristics and power requirements of the internal combustion engine 10. By way of non-limiting examples, the fuel 14 may have a generally conical shape, a generally triangular shape, a generally cylindrical shape, a generally oblong shape, a generally oval shape, or a generally amorphous or irregular shape.

For example, as described with reference to FIG. 2, the fuel 14 may have a first boundary 78 and a second boundary 80 defining a spray angle 82 therebetween. In one specific non-limiting example, the fuel 14 may have a generally conical shape and may include a base plane 74, e.g., a generally circular base plane, a central longitudinal axis 76 extending from and disposed perpendicular to the base plane 74, the first boundary 78 intersecting the base plane 74, and the second boundary 80 intersecting the base plane 74. Therefore, the first boundary 78 and the second boundary 80 may define the spray angle 82 therebetween and may intersect at a vertex 84 spaced apart from the base plane 74 along the central longitudinal axis 76. That is, the vertex 84 may be aligned with the end valve 70 of the fuel nozzle 68.

With continued reference to FIGS. 2 and 9, the internal combustion engine 10 also includes a plasma igniter 100 which extends through the cylinder head 18 and protrudes into the combustion chamber 24. The igniter 100 can be selectively energized to generate a first plurality of free radicals 188, and selectively de-energized and re-energized to generate one or more subsequent pluralities of free radicals 188 after generating the first plurality of free radicals 188. The igniter 100 can be activated to initiate a flame 102 within the combustion chamber 24 to ignite the fuel 14 thereby set off combustion and consumption of the fuel 14 within the combustion chamber 24.

The plasma igniter 100 may be selected according to desired combustion characteristics, including combustion phasing, within the combustion chamber 24. For example, the plasma igniter 100 may be a corona discharge plasma igniter 300 (shown generally in FIG. 2) configured for ejecting a plasma 90 (FIG. 3) having a plurality of streamers 104 (FIG. 3) into the combustion chamber 24 to thereby generate the first plurality of free radicals 188 within the combustion chamber 24. As used herein, the terminology "corona discharge plasma igniter" is contrasted with the terminology "spark plug" and "dielectric-barrier-discharge plasma igniter". The corona discharge plasma igniter 300 is configured for ejecting the plasma 90 as a corona including the plurality of streamers 104. Further, although not shown, the plasma igniter 100 may include a high-voltage transformer having a primary side and a secondary side. As a non-limiting example, the primary side of the plasma igniter 100, e.g., the side of the plasma igniter 100 which receives an electrical input signal, may have a voltage of from about 45 V to about 75 V, an electrical current of from about 1 A to about 2.5 A, and a power of from about 90 W to about 110

W. As a non-limiting example, the secondary side of the plasma igniter 100, e.g., the side of the plasma igniter 100 which generates an electrical field within the combustion chamber 24, may have a voltage of from about 10 kV to about 110 kV, and an electrical current of from about 20 mA to about 200 mA.

Figure 6:
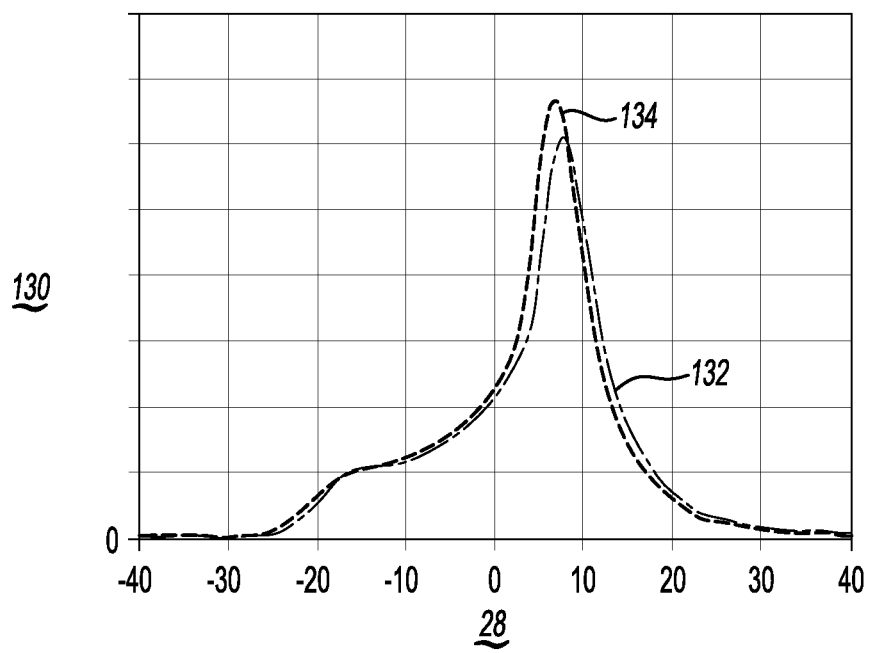
FIG. 6 is a schematic illustration of a relationship between heat release rate (HRR) as measured in Joules per crank angle degree (J/CAD), within the combustion chamber of FIG. 2 and rotational position as measured in angular degrees, of a piston disposed within the combustion chamber during the first example operating condition shown in FIG. 5, by a corona plasma discharge igniter with and without radical generation.

Referring to FIG. 2, the corona discharge plasma igniter 300 may be a two-piece assembly and may include an inductor 302 and a terminus 304 operatively connected to the inductor 302. Although shown only generally in FIG. 2, the terminus 304 may include from two to six individual electrodes 96, e.g., four individual electrodes 96, each spaced apart from one another and arranged in a star configuration (as shown generally in FIG. 3). When fired, the corona discharge plasma igniter 300 may emit an electrical field of from about 10 kV to about 110 kV from the terminus 304 into the combustion chamber 24. Without intending to be limited by theory, within several nanoseconds, the electrical field may excite the air within the combustion chamber 24 near the terminus 304 and the individual electrodes 96 until the electrical field transitions to the plasma 90, which includes a plurality of charged ions. Firing of the corona discharge plasma igniter 300 can be selectively controlled to generate an electrical field having a known voltage within the range of 10 kV to about 110 kV, where increasing the known voltage advances combustion phasing, as illustrated by FIG. 6.

Figure 3:
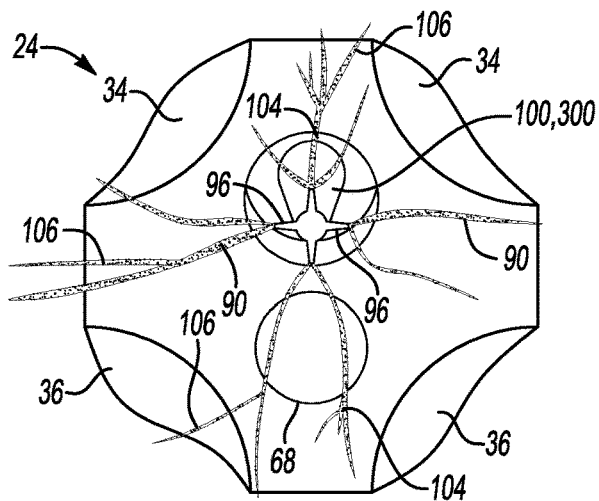
FIG. 3 is a schematic illustration of the plasma igniter of FIG. 2 and a plasma ejected therefrom as viewed from position V within the combustion chamber.

As described with reference to FIG. 3, as a density of the plurality of charged ions reaches a threshold, the plasma 90 may include the plurality of streamers 104 each extending from the terminus 304 (FIG. 2) and the plurality of electrodes 96. Each of the plurality of streamers 104 may be spaced apart from one another yet joined at a common center, e.g., the vertex 84. Each streamer 104 may also include one or more branches 106 emanating from the streamer 104. That is, as used herein, the terminology "streamer" refers to a portion of the plasma 90 having an elongated, flowing, ribbon-like appearance or characteristic. In other words, the plurality of streamers 104 may refer to a plurality of rays emanating or spreading out from a center of the plasma 90, and each streamer 104 may include one or more branches 106 which then further project or fork from the streamer 104. Each streamer 104 and/or branch 106 may be configured for exciting the air within the combustion chamber 24 to thereby generate a plurality of free radicals 188. The corona discharge plasma igniter 300 may be de-energized and re-energized to excite the air within the combustion chamber 24 to thereby generate a subsequent plurality of free radicals 188. Energizing and re-energizing of the corona discharge plasma igniter 300 can be controller, for example, via a controller such as an engine controller (not shown), such that the plurality of free radicals 188 generated has a known voltage. The corona discharge plasma igniter 300 may be activated such that each streamer 104 and/or branch 106 is configured for igniting the fuel 14 within the combustion chamber 24, where the plurality of streamers 104 may ignite several portions of the fuel 14 at the same time and may provide fast, homogeneous, and effective combustion of the fuel 14. In an illustrative example, activating the corona discharge plasma igniter 300 to ignite the fuel 14 is closely coupled in time with an injection event injecting fuel 14 into the combustion chamber 104.

Referring again to FIG. 3 and as set forth above, the terminus 304 may extend into the combustion chamber 24 at a desired protrusion or depth. For example, the terminus 304 may be spaced apart from the cylinder head 18 by an interval 298 of from about 1 mm to about 15 mm, e.g., about 3 mm or about 5 mm or about 7 mm or about 9 mm or about 11 mm or about 13 mm. The interval 298 may be selected according to desired combustion characteristics within the combustion chamber 24, such as temperature, duration of combustion, and/or spray angle 82. For example, generally, the terminus 304 may extend farther into the combustion chamber 24, i.e., the interval 298 may be comparatively larger, for comparatively smaller spray angles 82. In one non-limiting example, the terminus 304 may protrude into the combustion chamber 24 at the interval 298 of from about 5 mm to about 15 mm, e.g., about 7 mm, and the spray angle 82 may be from about 50 degrees to about 70 degrees, e.g., about 60 degrees. In another non-limiting example, the terminus 304 may protrude into the combustion chamber 24 at the interval 298 of from about 1 mm to about 5 mm, e.g., about 3 mm, and the spray angle 82 may be from about 70 degrees to about 120 degrees, e.g., about 90 degrees.

For embodiments in which the plasma igniter 100 is configured as the dielectric-barrier-discharge (DBD) plasma igniter 400 (FIG. 9), the plasma igniter 100 may be a two-piece assembly and may include a body 92 defining a body portion 240 and firing portion 216. A firing tip 94 includes a central electrode 292 encased in the body 92 by a dielectric casing 234 and extending into the firing portion 216. The central electrode 292 can be selectively energized and/or activated at a voltage and for a duration controlled, for example, by a signal received from the engine controller, to control fuel ignition and combustion phasing. The dielectric casing 234 forms a dielectric barrier 214 between the central electrode 292 and the combustion chamber 24. By way of non-limiting example, the plasma igniter 100 may be a dielectric-barrier-discharge (DBD) plasma igniter 400 (shown generally in FIG. 9). The DBD plasma igniter 400 includes one or more dielectric or insulating barriers 214 (FIGS. 10-12) configured to eject an electrical current into the combustion chamber 24 to thereby generate one or more pluralities of free radicals 188, e.g., such that a plurality of free radicals 188 is generated each time the DBD plasma igniter 400 is energized. The dielectric barrier 214 may be formed of any dielectric material able to withstand the high temperatures and pressures of an engine 10 environment. For example, the dielectric material 214 may be a glass, quartz, or ceramic dielectric material 214, such as a high purity alumina. The example embodiments of DBD plasma igniters 400A, 400B, 400C, shown in FIGS. 10-12 are not intended to be limiting, such that, as used herein, the term DBD igniter 400 refers generally to any configuration of DBD plasma igniter including but not limited to the example DBD igniters 400A, 400B, 400C shown respectively in FIGS. 10A, 11 and 12.

Figure 10A:
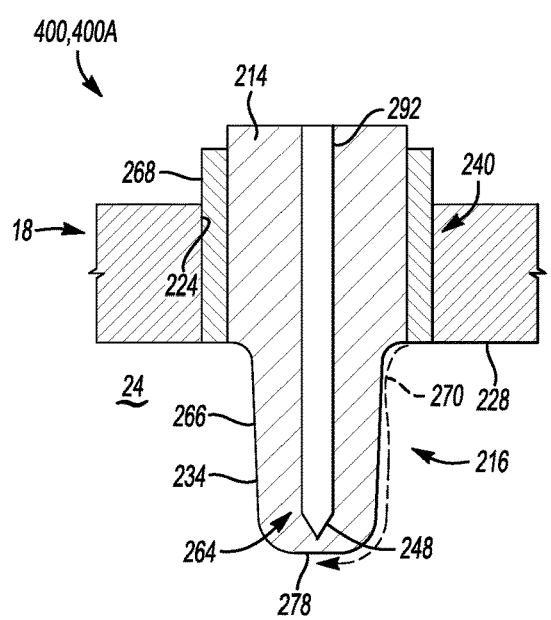
FIG. 10A is a schematic cross-sectional view of a first example configuration of the dielectric-barrier-discharge plasma igniter of FIG. 9, wherein the dielectric-barrier-discharge plasma igniter generates a streamer discharge along a surface of the dielectric barrier forming the firing portion.
Figure 10B:
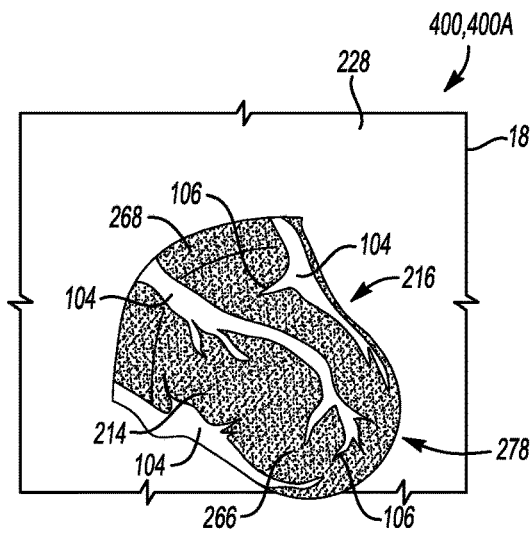
FIG. 10B is a perspective view of the firing portion of the dielectric-barrier-discharge plasma igniter of FIG. 10A, depicting a plurality of streamers generated by energizing the igniter during a single plasma discharge event.
Figure 11:
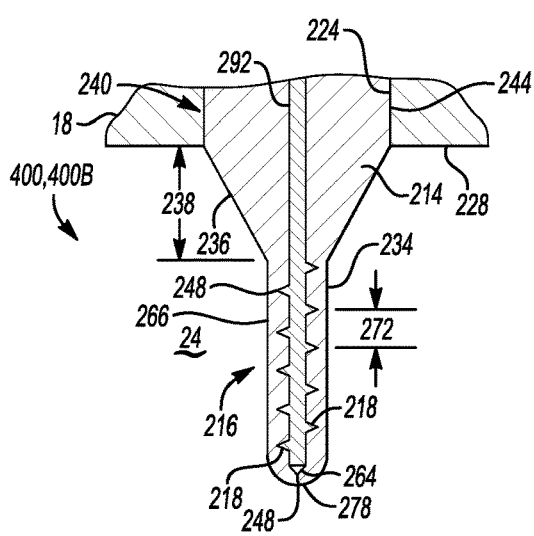
FIG. 11 is a schematic cross-sectional view of a second example configuration of the dielectric-barrier-discharge plasma igniter of FIG. 9, wherein the dielectric-barrier-discharge plasma igniter generates a streamer discharge along a surface of the dielectric barrier.
Figure 12:
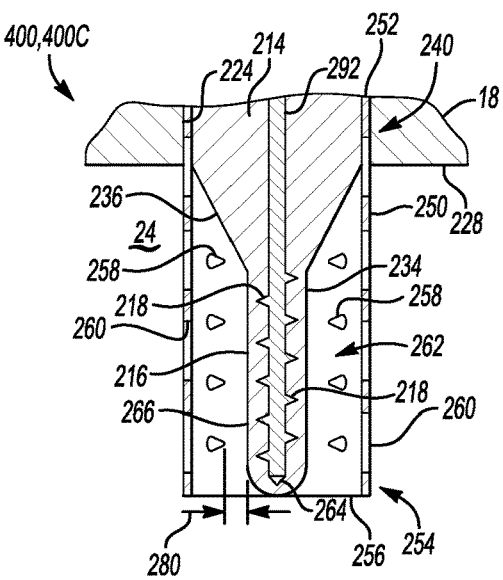
FIG. 12 is a schematic cross-sectional view of a third example configuration of the dielectric-barrier-discharge plasma igniter of FIG. 9, wherein the dielectric-barrier-discharge plasma igniter generates a streamer discharge generally confined between the dielectric barrier and a ground electrode surrounding the firing portion.

In the example configurations of DBD plasma igniters 400A, 400B, 400C shown respectively in FIGS. 10A, 11 and 12, the body 92 (FIG. 9) includes a first body portion 240 also referred to herein as an igniter body 240, a second body portion 216 also referred to herein as a firing portion 216, and may include a third body portion 236 also referred to herein as an igniter shank 236, intermediate the igniter body 240 and the firing portion 216. In the examples shown, the body 92 includes a dielectric casing 234 encasing a central electrode 292. The igniter body 240 may be generally cylindrical such that the igniter body 240 interfaces with a port interface 244 of an igniter port 224 defined by the cylinder head 18, such that the DBD igniter 400 extends through the cylinder head 18 and the shank 236 and firing portion 216 protrude into the combustion chamber 24. In the example shown in FIG. 10A, a mounting boss 268 may be disposed in the port interface 244 to receive the ignitor body 240. In the example shown in FIGS. 10A-10B, the firing portion 216 protrudes from the combustion chamber surface 228. In the examples shown in FIGS. 11-12, the shank 236 is generally conical in shape and tapers away from a chamber surface 228 of the combustion chamber 24. The shank 236 is characterized by a shank length 238 which provides a minimum clearance or distance between the firing portion 216 and the combustion chamber surface 228. The igniter body 240 including the shank 236 may be made of an insulating material to prevent direct electrical contact between the firing tip 94 and a surface within the combustion chamber 24 which may act as an electrical ground, such as the chamber surface 228 or a surface of the piston 22 (FIG. 9) in the combustion chamber 24 below the DBD plasma igniter 400.

In the example configurations of DBD plasma igniters 400A, 400B, 400C shown respectively in FIGS. 10A, 11 and 12, the firing tip 94 (FIG. 9) includes a central electrode 292 including a firing portion 216 and at least one firing prong 218. As shown in FIG. 10A, the central electrode 292 terminates in an electrode end 264 defining a prong tip 248, such that the electrode end 264 also functions as a firing prong 218 for the DBD plasma igniter 400A. In the examples shown in FIGS. 10A-12, a plurality of firing prongs 218 can be distributed axially along the firing portion 216, where firing prongs 218 are axially spaced from an adjacent firing prong 218 by a prong axial spacing 272. The firing portion 216 terminates in an electrode end 264. Each of the firing prongs 218 and the electrode end 264 terminates in a prong tip 248. The firing prong 218 is shaped such that the cross-sectional area of the prong tip 248 is smaller relative to the remainder of the firing prong 218, and such that when a high frequency voltage is applied to the central electrode 292 an electric field formed at each firing prong 218 is concentrated at the prong tip 248 of the respective firing prong 218. By way of non-limiting example, the firing prong 218 can be generally conical in shape, with the prong tip 248 defined by the apex of the conical shape. In another non-limiting example, the firing prong 218 can be shaped as a generally triangular blade terminating in a prong tip 248 defined by the apex of the triangle. When energized, the plasma igniter 100 can emit an electrical field of between 10 kV and 110 kV at a frequency between 60 Hz and 10 MHz. from the prong tips 248. The central electrode 292 and firing prongs 218 are made of a highly conductive material able to withstand the high temperatures and pressures of the environment of the engine 10. For example, the central electrode 292 and firing prongs 218 may be made of a refractory metal and/or alloys of refractory metals. In a non-limiting example, the central electrode 292 and/or firing prongs 218 may be made of a tungsten-containing material and/or an iridium-containing material.

Without intending to be limited by theory, within several nanoseconds of being energized, the electrical field may generate a plurality of free radicals 188 within the combustion chamber 24. The DBD plasma igniter 400 can be selectively activated, by application of a high frequency voltage to the central electrode 292 of the firing tip 94, to form plasma streamers 104 at each prong tip 248. The formation of the plasma streamers 104 is affected by the dielectric casing 234 such that the barrier discharge at the dielectric casing 234 forming a dielectric barrier over the firing prong 218 causes the continuous formation, discharge and reformation of the plasma streamers 104 at the tips 248 of each of the firing prongs 218 during application of high voltage to the central electrode 292, and such that the plasma streamers 104 formed in this manner are self-propagating and continuously forming at the tip 248 of each firing prong 218, and are self-extinguishing due to charge trapping occurring at the dielectric barrier formed by the casing 234, such that the plasma streamers 104 so formed self-extinguish prior to arcing. The plasma streamers 104 ignite the combustible air-fuel mixture in the combustion chamber 24 proximate the firing portion 216, causing flame development and fuel burn in the combustion chamber 24.

Figure 7:
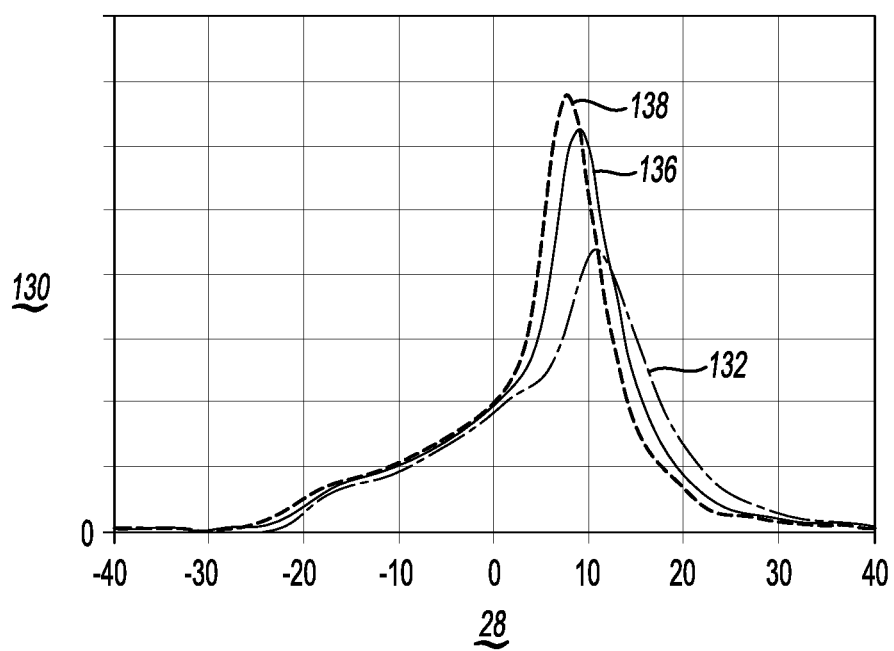
FIG. 7 is a schematic illustration of a relationship between heat release rate (HRR) as measured in Joules per crank angle degree (J/CAD), within the combustion chamber of FIG. 9 and rotational position as measured in angular degrees, of a piston disposed within the combustion chamber during the first example operating condition shown in FIG. 5, without radical generation and with radical generation by a dielectric-barrier-discharge plasma igniter at various igniter energizing voltages.

In a non-limiting example, the DBD plasma igniter 400 can be selectively energized, by application of a known high frequency voltage to the central electrode 292 of the firing tip 94 to emit plasma streamers 104 which generate a plurality of free radicals 188 forming an electrical field having a known voltage. The energizing voltage and the generated electrical field voltage can be selected to achieve certain ignition characteristics, including combustion phasing. For example, FIG. 7 shows a heat release rate 130 for two different operating conditions 136, 138, where the energizing voltage and generated electrical field voltage for operating condition 138 are relatively higher than for operating condition 136. By using the relatively higher energizing voltage of operating condition 138 to energize the BDB igniter 400, combustion phasing is advanced relative to operating condition 136, as depicted by the shift of curve 138 to the left (as shown on the page) relative to curve 136. Similarly, by using the relatively lower energizing voltage of operating condition 136 to energize the DBD igniter 400, combustion phasing is retarded relative to operating condition 138, as depicted by the shift of curve 136 to the right (as shown on the page) relative to curve 138.

The configuration of the DBD plasma igniter 400 may be selected according to desired combustion characteristics within the combustion chamber 24. In one example, the DBD plasma igniter 400 can be configured as the DBD plasma igniter 400A shown in FIG. 10A, having a dielectric barrier 214 formed as a dielectric casing 234, such that when the DBD plasma igniter 400A (FIG. 10) is energized during a plasma discharge event, a streamer discharge comprised of streamers 104 (FIG. 10B) is generated along a casing surface 266 of the dielectric casing 234, as depicted by a streamer path 270 shown in FIG. 10A. During a plasma discharge event, the DBD plasma igniter 400, 400A generates one or a plurality of plasma discharge streamers 104, which, as shown in FIG. 10B, originate at the mounting boss 268 and propagate towards the casing end 278. The plasma discharge streamers 104 may propagate across a surface 266 of the dielectric casing 234 in multiple radial locations and terminate on the casing end 278 at or near the prong tip 248. Each streamer 104 may also include one or more branches 106 emanating from the streamer 104. As used herein, the terminology "streamer" refers to a portion of the plasma 90 having an elongated, flowing, ribbon-like appearance or characteristic, and each streamer 104 may include one or more branches 106 which then further project or fork from the streamer 104. Each streamer 104 and/or branch 106 may be configured for exciting the air within the combustion chamber 24 to thereby generate a plurality of free radicals 188.

In another example, the DBD plasma igniter 400 can be configured as the DBD plasma igniter 400B shown in FIG. 11, where the dielectric casing 234 may be integral with the shank 236 of the body 240 and the shank portion 236 may be made of the dielectric material 214, such that the length of the central electrode 292 extending into the combustion chamber 24 in an installed position is fully encapsulated by the dielectric material 214. The casing 234 is configured such that the dielectric barrier is of variable thickness, such that the electric field accumulated in the dielectric barrier of the casing 234 is variable with the thickness of the casing 234. In the example shown in FIGS. 11 and 12, the casing 234 defines a casing surface 266 which is generally cylindrical and coaxial with the central electrode 292 such that the casing 234 is relatively thicker in the axial length between the firing prongs 218, and decreases in thickness between the casing surface 266 and the firing prong 218 as the firing prong 218 tapers to the prong tip 248, such that the dielectric casing 234 is thinnest at the prong tip 248 of each firing prong 218. By way of example, the dielectric casing 234 may be configured such that at the prong tip 248 the thickness of the dielectric barrier 214 between the prong tip 248 and the casing surface 266 is in the range of 0.5 mm-2 mm. The casing 234 terminates at a casing end 278 which encapsulates the electrode end 264. The casing end 278 can be shaped as a hemisphere (FIGS. 10A, 11, and 12). This example is non-limiting, and the casing end 278 may be otherwise shaped and/or contoured relative to the contour of the electrode end 264, to provide a relative thinner casing thickness 246 between the prong tip 248 of the electrode end 264 and the casing surface 266. The casing end 278 may be shaped, for example, as a conical end, a cylindrical end, a chamfered cylindrical end, etc.

In another example, the DBD plasma igniter 400 can be configured as a DBD plasma igniter 400C (FIG. 12) having a dielectric barrier 214 formed as a dielectric casing 234, and including a ground electrode 250, such that when the DBD plasma igniter 400C is energized, a streamer discharge 104 is generated and is confined between the dielectric barrier 214 and the ground electrode 250. In a non-limiting example, the ground electrode 250 is a generally cylindrical electrode operatively attached to the igniter body 240 such that the ground electrode 250 is coaxial with the central electrode 292 and defines a discharge cavity 262 between the ground electrode 250 and the firing portion 216 of the central electrode 292. The ground electrode 250 is made of an electrically conductive material able to withstand the high temperatures and high pressures of the combustion chamber 24 environment. In one example, the ground electrode 250 may be made of a refractory metal and/or alloys of refractory metals. In a non-limiting example, the ground electrode 250 may be made of a tungsten-containing material and/or an iridium-containing material.

In the examples shown, the ground electrode 250 includes a plurality of ground prongs 258 distributed longitudinally along and extending radially from the interior surface of the generally cylindrical ground electrode 250 toward the firing portion 216, e.g., extending radially inward into the discharge cavity 262. A discharge gap 280 is defined between closest adjacent surfaces of the ground electrode 250 and the central electrode 292. In the example shown in FIG. 12, the discharge gap 280 is defined by the gap between the prong tips 248 of the ground prongs 258 and the casing surface 266. The ground prongs 258 are distributed and positioned relative to the firing prongs 218 such that there are multiple streamers forming between the firing prongs 218 and the ground prongs 258 in the discharge cavity 262, which may or may not cross each other, yet are distributed radially throughout the discharge cavity 262.

For example and as shown in FIG. 12, the ground electrode 250 is attached to and surrounds the igniter body 240 at a port end 252 of the DBD plasma igniter 400C such that the ground electrode 250 defines the port interface 244, and such that in the installed position the ground electrode 250 is in contact with the igniter port 224 of the cylinder head 18.

The ground electrode 250 is open at a firing end 254, defining an orifice 256 to allow for flow of the air-fuel combustible mixture from the combustion chamber 24 into the discharge cavity 262 of the ground electrode 250. The ground electrode 250 further includes a plurality of apertures 260 formed in the cylindrical portion of the ground electrode 250 adjacent the firing portion 216. The plurality of apertures 260 are distributed longitudinally and radially in the longitudinal length of the ground electrode 250 adjacent the firing portion 216 to allow for additional flow of the air-fuel combustible mixture from the combustion chamber 24 into the discharge cavity 262 of the ground electrode 250 along the longitudinal length of the firing portion 216. The orifice 256 and the plurality of apertures 260 each define an ignition path from the discharge cavity 262 to the combustion chamber 24, such that multiple ignition paths are provided radially and axially along the entire longitudinal length the DBD plasma igniter 400C extends into the combustion chamber 24. The plurality of apertures 260 may be characterized as a plurality of flame ports such that flame development and fuel burn is distributed radially and axially from the full length of the firing portion 216, increasing fuel burn efficiency by igniting the air-fuel mixture in the combustion chamber 24 at each of the multiple flame ports and in a volume extending radially and axially from the outwardly facing surface of the ground electrode 250.

The example configurations of DBD plasma igniters 400A, 400B, 400C are non-limiting, and other configurations of DBD plasma igniters 400 can be incorporated into the engine 10 and configured for energizing to produce a plurality of free radicals 188 during a plasma discharge event and for activating to ignite fuel 14 in the combustion chamber 24. By way of example, the electrode 292 shown in DBD plasma igniter 400A (FIG. 10A) could be incorporated either of the DBD plasma igniters 400B, 400C (FIGS. 11, 12). In another example, the ground electrode 250 could be configured without ground prongs 258.

Figure 4:
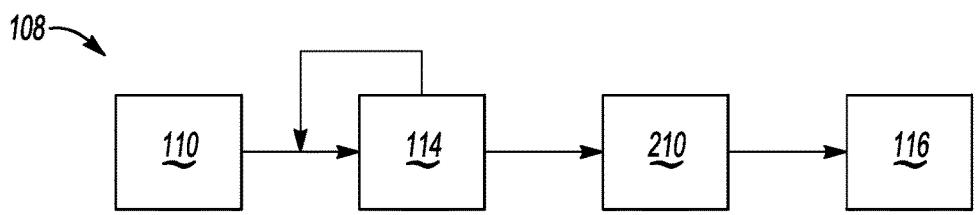
FIG. 4 is a schematic flowchart of a first example method of igniting a fuel within the combustion chamber of FIG. 1.

Referring now to FIG. 4, a method 108 of igniting the fuel 14 within the combustion chamber 24 is disclosed. The method 108 includes injecting 110 a first portion 112 (FIG. 5) of the fuel 14 into the combustion chamber 24. That is, injecting 110 may include ejecting the first portion 112 from the fuel nozzle 68 in a desired quantity and/or at a desired rotational position 28 of the crankshaft 12. The quantity and timing of such injection may be controlled by a suitable controller (not shown) and/or computational system, e.g., an engine control unit of the vehicle. Both the quantity of the first portion 112 and the timing of injecting 110 the first portion 112 may be selected according to the desired characteristics of a mixture of the intake air 40 and fuel 14 within the combustion chamber 24; the valve protocol 64; and/or the operating condition of the internal combustion engine 10. For example, the first portion 112 may be from about 1 mg to about 20 mg of fuel 14, or from about 3 mg to about 15 mg of fuel 14, or from about 9 mg to about 13 mg of fuel 14, or about 10.5 mg of fuel 14. Further, injecting 110 may occur at any desired rotational position 28 of the crankshaft 12. In a non-limiting example described with reference to FIG. 5, the fuel nozzle 68 may inject the first portion 112 of the fuel 14 into the combustion chamber 24 when the crankshaft 12 has the rotational position 28 of from about −300 degrees to about −270 degrees in the example shown in FIG. 5, the fuel nozzle 68 injects the first portion 112 of the fuel 14 into the combustion chamber 24 when the crankshaft 12 has the rotational position 28 of at or about −270 degrees. As described with reference to FIG. 5, the method 108 may also include injecting 210 a second portion 212 of the fuel 14 into the combustion chamber 24 after energizing 114 the plasma igniter 100 one or more times to generate one or more pluralities of free radicals 188 in the combustion chamber 24, and prior to activating 116 the plasma igniter 100 to ignite the fuel 14 in the combustion chamber 24. Injecting 210 may include ejecting the second portion 212 from the fuel nozzle 68 after injection of the first portion 112 in a desired quantity and/or at a desired rotational position 28 of the crankshaft 12. Therefore, the first portion 112 and the second portion 212 are injected into the combustion chamber 24 separately and represent unique or distinct fuel-injection events. Stated differently, the method 108 may include multiple injections of fuel 14.

Both the quantity of the second portion 212 and the timing of injecting 210 the second portion 212 may be selected according to the desired characteristics of the mixture of the intake air 40 and fuel 14 within the combustion chamber 24; the valve protocol 64, and/or the operating condition of the internal combustion engine 10. Further, the second portion 212 may be less than, equal to, or greater than the first portion 112. For example, the second portion 212 may be from about 1 mg to about 20 mg of fuel 14, or from about 5 mg to about 15 mg of fuel 14, or about 10.5 mg of fuel 14. Further, injecting 210 may occur at any desired rotational position 28 of the crankshaft 12. As non-limiting examples, the fuel nozzle 68 may inject the second portion 212 of the fuel 14 into the combustion chamber 24 when the crankshaft 12 has the rotational position 28 of from about −90 degrees to about 0 degrees, or from about −60 degrees to about −20 degrees. In the example shown in FIG. 5, the fuel nozzle 68 injects the second portion 212 of the fuel 14 into the combustion chamber 24 when the crankshaft 12 has the rotational position 28 of at or about −33 degrees. The second injection may also be controlled by a suitable controller (not shown) and/or computational system, e.g., the engine control unit of the vehicle. Therefore, the first portion 112 and the second portion 212 may be injected into the combustion chamber 24 separately and may represent unique or distinct fuel-injection events. In the example shown in FIG. 5, the first portion 112 and the second portion 212 of the fuel 14 is injected 110, 210 into the combustion chamber 24 prior to activating 116 the plasma igniter 100 to ignite the fuel 14 in the combustion chamber 24. As shown in FIG. 5, the event of activating 116 the plasma igniter 100 to ignite the fuel 14 is closely coupled to the second injection event 210 of the second portion 212 of fuel 14 into the combustion chamber 24, that is, injecting 210 and activating 116 occur in close time proximity and under similar cranking conditions. In one example, the events of injecting 210 the second fuel portion 212 and activating 116 the plasma igniter 100 occur within 6 crank angle degrees of each other, and preferably within a range of 2 to 4 crank angle degrees from each other. By way of example, FIG. 5 shows fuel injection event 210 occurring at a crank angle of −33 degrees and igniter activation event 116 occurring at a crank angle of −27 degrees.

Referring again to FIG. 4, the method 108 includes energizing 114 the plasma igniter 100 within the combustion chamber 24 to generate a plurality of free radicals 188. Such energizing 114 may likewise be controlled by a suitable controller (not shown) and/or computational system, e.g., an engine control unit of the vehicle. The method 108 can include energizing 114 the plasma igniter 100 to generate a first plurality of free radicals 188, and subsequently de-energizing and re-energizing 114 the plasma igniter 100 one or more times to generate one or more subsequent pluralities of free radicals 188. As indicated in FIGS. 4 and 5, energizing 114 and subsequent de-energizing and re-energizing 114 of the plasma igniter 100 occurs after injecting 110 the first portion 112 of the fuel 14, and prior to injecting 210 the second portion 212 of the fuel 14. For example, the plasma igniter 100 can be initially energized 114 when the crankshaft 12 has the rotational position 28 of from about −270 degrees to about −230 degrees, or at about −250 degrees to generate a first plurality of free radicals 188 in the combustion chamber 24. As shown in protocol 64 in FIG. 5, the plasma igniter 100 can then subsequently be de-energized and re-energized 114 when the crankshaft 12 has the rotational position 28 of from about −200 degrees to about −160 degrees, or at about −180 degrees to generate a second plurality of free radicals 188.

Referring again to FIGS. 4 and 5, the method 108 also includes, after injecting 110, 210 the first and second portions 112, 212 of the fuel 14, and after energizing 114 the plasma igniter 100 to generate one or more pluralities of free radicals 188, activating 116 the igniter 100 within the combustion chamber 24 to thereby ignite the fuel 14. Activating 116 the plasma igniter 100, which may be, for example, the corona discharge plasma igniter 300, or the DBD plasma igniter 400 as set forth above, initiates the flame 102 within the combustion chamber 24 and thereby ignites the fuel 14. Therefore, the method 108 can include multiple plasma ignition events, and such plasma ignition events, i.e., energizing 114 and activating 116, may be controlled by a suitable controller (not shown) and/or computational system, e.g., an engine control unit of a vehicle containing the engine 10. In the example illustrated by FIGS. 4 and 5, activating 116 occurs subsequent to energizing 114 the plasma igniter 100 and subsequent to injecting 210 the second portion 212 of the fuel 24 into the combustion chamber 24. For example, the igniter 100 may be activated when the crankshaft 12 has the rotational position 28 of from about −30 degrees to about 0 degrees, or at or about −27 degrees.

Therefore, the method 108 allows for multiple ignition events, i.e., energizing 114, de-energizing and re-energizing 114, activating 116 by the plasma igniter 100 in the combustion chamber 24. Additionally, the method 108 allows for multiple fuel-injection events, i.e., injecting 110 the first portion 112 and injecting 210 the second portion 212 to optimize combustion of the fuel 14 within the combustion chamber 24 and thereby optimize operation and performance of the internal combustion engine 10. Therefore, the method 108 also allows for precise control and customization of a specific quality, timing, and/or duration of flame initiation within the combustion chamber 24 in relation to the quantity, timing, and/or duration of generating one or more pluralities of free radicals 188 within the combustion chamber 24 and injecting multiple portions 112, 212 of the fuel 14 into the combustion chamber 24, and control of combustion phasing during the fuel combustion event.

The method 108 may be suitable for use with both the positive valve overlap (PVO) valve protocol 64 (FIG. 5) and a negative valve overlap (NVO) valve protocol (not shown) for operating the internal combustion engine 10. In particular, for each of the PVO valve protocol 64 and the NVO valve protocol, the method 108 includes, during the intake stroke 54 of the piston 22, injecting 110 the first portion 112 of the fuel 14 into the combustion chamber 24 and subsequently energizing the plasma igniter 100 to generate a first plurality of free radicals 188 in the combustion chamber 24, de-energizing the plasma igniter 100, and translating 120 (FIG. 5) the intake valve 34 from the seated position 42 to the unseated position 44. Further, the method 108 includes, during the compression stroke 56 of the piston 22 and after translating 120 the intake valve 34 to the seated position 42, re-energizing the plasma igniter 100 to generate a second plurality of free radicals 188, de-energizing the plasma igniter 100, injecting 210 the second portion 212 of the fuel 14 into the combustion chamber 24, and subsequently activating the plasma igniter 100 to ignite the fuel 14 in the combustion chamber 24.

Referring now to FIG. 6, shown is a schematic illustration of a relationship between a rate of combustion heat release 130 within the combustion chamber 24, as measured in Joules per crank angle degree (J/CAD), and the rotational position 28 measured in angular degrees of the piston 22 disposed within the combustion chamber 24, where the plasma igniter 100 is configured as a corona discharge plasma igniter 300 as shown in FIG. 2. The rate of combustion heat release 130 is also referred to herein as a heat release rate (HRR) 130. In the example shown in FIG. 6, the engine 10 is operated under a first operating condition 132 and a second operating condition 134, to generate HRRs 130 indicated respectively in FIG. 6 at 132, 134. During the first operating condition 132, the method used for igniting the fuel 14 in the combustion chamber 24 includes injecting 110 a first portion 112 of the fuel 14, injecting 210 a second portion 212 of the fuel 14, and activating 116 the corona discharge plasma igniter 300 to ignite the fuel 14 in the combustion chamber 24 as described for the protocol 64 shown in FIG. 5. However, during the first operating condition 132, the corona discharge plasma igniter 300 is not energized 114, and as such, does not generate any free radicals 188 in the combustion chamber 24 prior to being activated 116 to ignite the fuel 14 in the chamber 24 to generate the HRR 130 for the first operating condition 132 (identified at 132 in FIG. 6).

During the second operating condition 134, the method 108 shown in FIG. 4 and protocol 64 shown in FIG. 5 is used to ignite the fuel 14 in the combustion chamber to generate the HRR 130 for the second operating condition 134 (identified at 134 in FIG. 6). That is, the second operating condition 134 includes a corona discharge plasma igniter 300 injecting 110 a first portion 112 of fuel 14 into the combustion chamber 24, subsequently energizing 114 the corona discharge plasma igniter 300 to generate a first plurality of free radicals 188 in the combustion chamber 24, subsequently de-energizing and re-energizing 114 the corona discharge plasma igniter 300 to generate a second plurality of free radicals 188 in the combustion chamber 24, injecting 210 a second portion 212 of the fuel 14, and subsequently activating 116 the corona discharge plasma igniter 300 to ignite the fuel 14 in the combustion chamber to generate a HRR 130 depicted at 134 in FIG. 6. In the example shown, energizing of the corona discharge plasma igniter 300 to generate the free radicals 188 is controlled by a suitable controller (not shown) and/or computational system, e.g., an engine control unit of the vehicle such that the voltage of the electrical field generated during generation of the plurality of free radicals 188 (the energized voltage) is less than a voltage of an electrical field which would generate arcing in the combustion chamber 24 (an arcing voltage).

Still referring to FIG. 6, and as shown by the comparison of the HRR 130 generated under the first and second conditions 132, 134, the combustion phasing can be advanced and the HRR 130 in the combustion chamber 24 can be increased during the second operating condition 134 relative to the first operating condition 132, by generating one or more pluralities of free radicals 188 after injecting 110 the first portion 112 of fuel 14 and prior to injecting 210 the second portion 212 of the fuel 14 according to the protocol 64 shown in FIG. 5. As such, the addition of generating one or more pluralities of free radicals 188 between the first and second injections 110, 112 of the fuel 14 increases the HRR 130 and thereby increases the efficiency and effectiveness of combustion within the combustion chamber 24 during operation of the internal combustion engine 10 under the operating condition 134, relative to operating condition 132, and advances the combustion phasing (e.g., shifts the HRR curve 134 to the left (as shown on the page) of HRR curve 132), in turn providing for improved fuel economy and reduced emissions under operating condition 134 relative to operating condition 132.

Referring now to FIG. 7, shown is a relationship between heat release rate (HRR) 130 within the combustion chamber 24 during example operating conditions 132, 136 and 138, where the plasma igniter 100 is configured as a dielectric barrier discharge (DBD) plasma igniter 400 (FIG. 9). In the example shown in FIG. 7, the engine 10 is operated under the first operating condition 132 and a third and fourth operating condition 136, 138, to generate HRRs 130 indicated respectively in FIG. 7 at 132, 136, and 138. During the first operating condition 132, the method used for igniting the fuel 14 in the combustion chamber 24 includes injecting 110 a first portion 112 of the fuel 14, injecting 210 a second portion 212 of the fuel 14, and activating 116 the DBD plasma igniter 400 to ignite the fuel 14 in the combustion chamber 24 as described for the protocol 64 shown in FIG. 5. However, during the first operating condition 132, the DBD plasma igniter 400 is not energized 114, and as such, does not generate any free radicals 188 in the combustion chamber 24 prior to being activated 116 to ignite the fuel 14 in the chamber 24 to generate the HRR 130 for the first operating condition 132 (identified at 132 in FIG. 7).

During the third and fourth operating conditions 136, 138, the method 108 shown in FIG. 4 and protocol 64 shown in FIG. 5 is used to ignite the fuel 14 in the combustion chamber 24 (FIG. 9) using the DBD plasma igniter 400, to generate the HRRs 130 identified respectively at 136, 138 in FIG. 7. That is, each of the third and fourth operating conditions 136, 138 includes a DBD plasma igniter 400 injecting 110 a first portion 112 of fuel 14 into the combustion chamber 24, subsequently energizing 114 the DBD plasma igniter 400 to generate a first plurality of free radicals 188 in the combustion chamber 24, subsequently de-energizing and re-energizing 114 the DBD plasma igniter 400 to generate a second plurality of free radicals 188 in the combustion chamber 24, injecting 210 a second portion 212 of the fuel 14, and subsequently activating 116 the DBD plasma igniter 400 to ignite the fuel 14 in the combustion chamber to generate a HRR 130 depicted respectively at 136, 138 in FIG. 7. In the example shown, energizing of the DBD plasma igniter 400 to generate the free radicals 188 is controlled by a suitable controller (not shown) and/or computational system, e.g., an engine control unit of the vehicle such that the voltage of the electrical field generated during generation of the plurality of free radicals 188 (the energized voltage) is selectively controlled at a predetermined voltage.

In the example shown, the energized voltage of the electrical field generated during generation of the plurality of free radicals 188 for the third condition 136 is a first predetermined voltage which is less than a second predetermined voltage, where the energized voltage of the electrical field generated during generation of the plurality of free radicals 188 for the fourth condition 138 is controlled at the second predetermined voltage. In an illustrative example, the energized voltage of the electrical field generated for the third condition 136 is a first predetermined voltage of 30 kilovolts (kV), and the energized voltage of the electrical field generated for the fourth condition 138 is a second predetermined voltage of 50 kV.

As shown in FIG. 7 by the comparison of the HRR 130 generated under the first condition 132 and the HRR 130 generated under the third and fourth conditions 136, 138, the HRR 130 in the combustion chamber 24 can be increased and the combustion phasing can be advanced during the third and fourth operating conditions 136, 138 relative to the first operating condition 132, by energizing 114 the DBD plasma igniter 400 (FIG. 9) to generate one or more pluralities of free radicals 188 after injecting 110 the first portion 112 of fuel 14 and prior to injecting 210 the second portion 212 of the fuel 14 according to the protocol 64 shown in FIG. 5. As such, the addition of generating one or more pluralities of free radicals 188 between the first and second injections 110, 112 of the fuel 14 increases the HRR 130, advances the combustion phasing, and thereby increases the efficiency and effectiveness of combustion within the combustion chamber 24 during operation of the internal combustion engine 10 under the operating conditions 136, 138, relative to operating condition 132, in turn providing for improved fuel economy and reduced emissions under operating conditions 136, 138 relative to operating condition 132.

Still referring to FIG. 7, and as shown by the comparison of the HRR 130 generated under the third condition 136 and the HRR 130 generated under the fourth condition 138, the combustion phasing of the combustion event and the HRR 130 in the combustion chamber 24 can be increased during the fourth operating condition 138 relative to the third operating condition 136, by energizing 114 the DBD plasma igniter 400 (FIG. 9) to generate one or more pluralities of free radicals 188 to generate an electrical field having a higher energizing voltage during the fourth operating condition 138 relative to a lower energizing voltage of the electrical field generated under the third operating condition 136. As previously described herein, in an illustrative example the energized voltage of the electrical field generated for the third condition 136 is 40 volts, and the energized voltage of the electrical field generated for the fourth condition 138 is 50 volts. As such, selectively increasing the energized voltage of the electrical field generated during generation of the one or more pluralities of free radicals 188 between the first and second injections 110, 112 of the fuel 14 increases the HRR 130 as shown by the relatively higher HRR 130 for the fourth condition 138 (indicated at 138 in FIG. 7) compared to HRR 130 for the third operating condition 136 (indicated at 136 in FIG. 7), and advances the combustion phasing shown by the shifting of the HRR curve 130 for the fourth condition 138 to the left (as shown on the page) of the HRR curve 130 for the third condition 136. As such, increasing the energized voltage of the electrical field generated during generation of the free radicals 188 thereby increases the efficiency and effectiveness of combustion within the combustion chamber 24 during operation of the internal combustion engine 10 under the fourth operating condition 138, relative to third operating condition 136, in turn providing for improved fuel economy and reduced emissions under operating conditions 138 relative to operating condition 136.

Figure 8:
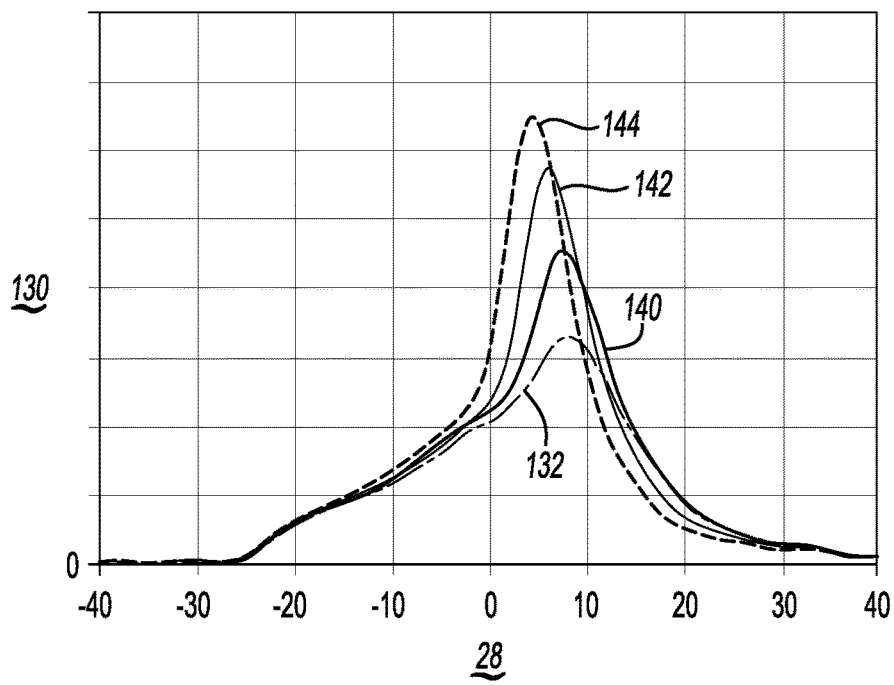
FIG. 8 is a schematic illustration of a relationship between heat release rate (HRR) as measured in Joules per crank angle degree (J/CAD), within the combustion chamber of FIG. 9 and rotational position as measured in angular degrees, of a piston disposed within the combustion chamber during the first example operating condition shown in FIG. 5, without radical generation and with radical generation while selectively energizing and de-energizing the igniter to generate multiple pluralities of radicals.

Referring now to FIG. 8, shown is a relationship between heat release rate (HRR) 130 within the combustion chamber 24 during example operating conditions 132, 140, 142 and 144, where the plasma igniter 100 is configured as a dielectric barrier discharge (DBD) plasma igniter 400 (FIG. 9). In the example shown in FIG. 8, the engine 10 is operated under the first operating condition 132 and a fifth, sixth and seventh operating condition 140, 142 and 144, to generate HRRs 130 for the first, fifth, sixth and seventh operating conditions 132, 140, 142, 144 (indicated respectively in FIG. 8 at 132, 140, 142, and 144). During the first operating condition 132, the method used for igniting the fuel 14 in the combustion chamber 24 includes injecting 110 a first portion 112 of the fuel 14, injecting 210 a second portion 212 of the fuel 14, and activating 116 the DBD plasma igniter 400 to ignite the fuel 14 in the combustion chamber as described for the protocol 64 shown in FIG. 5. However, during the first operating condition 132, the DBD plasma igniter 400 is not energized 114, and as such, does not generate any free radicals 188 in the combustion chamber 24 prior to being activated 116 to ignite the fuel 14 in the chamber 24 to generate the HRR 130 identified at 132 in FIG. 8.

During the fifth, sixth and seventh operating conditions 140, 142 and 144, the method 108 shown in FIG. 4 and protocol 64 shown in FIG. 5 is used to ignite the fuel 14 in the combustion chamber 24 (FIG. 9) using the DBD plasma igniter 400, to generate the HRRs 130 for the fifth, sixth and seventh operating conditions 140, 142 and 144 and identified respectively at 140, 142 and 144 in FIG. 8. That is, each of the fifth, sixth and seventh operating conditions 140, 142, 144 includes injecting 110 a first portion 112 of fuel 14 into the combustion chamber 24, subsequently energizing 114 the DBD plasma igniter 400 to generate a first plurality of free radicals 188 in the combustion chamber 24, subsequently de-energizing and re-energizing 114 the DBD plasma igniter 400 to generate at least one additional plurality of free radicals 188 in the combustion chamber 24, subsequently injecting 210 a second portion 212 of the fuel 14, and subsequently activating 116 the DBD plasma igniter 400 to ignite the fuel 14 in the combustion chamber to generate a HRR 130 depicted respectively at 140, 142, and 144 in FIG. 8.

The fifth, sixth and seventh operating conditions 140, 142 and 144 are distinguished from each other and from the first operating condition 132 by the number of pluralities of free radicals 188 generated during execution of the method 108 to ignite the fuel 14 in the combustion chamber 24. As described previously, during the first operating condition 132, the DBD plasma igniter 400 is not energized 114, and as such, does not generate any free radicals 188 in the combustion chamber 24 prior to being activated 116 to ignite the fuel 14 in the chamber 24 to generate the HRR 130 for the first operating condition, identified at 132 in FIG. 8. In the fifth operating condition 140, subsequent to injecting 110 the first portion 112 of fuel 14, the DBD igniter 400 is energized 114, de-energized and re-energized 114 as shown in FIG. 5 to generate two pluralities of free radicals 188 prior to injecting 210 the second portion 212 of the fuel 14 and then subsequently activating 116 the DBD igniter 400 to ignite the fuel 14 in the combustion chamber 24. In the sixth operating condition 142, subsequent to injecting 110 the first portion 112 of fuel 14, the DBD igniter 400 is energized 114, de-energized a first time and re-energized 114, then de-energized a second time and re-energized 114 according to the method 108 (FIG. 4) to generate three pluralities of free radicals 188 prior to injecting 210 the second portion 212 of the fuel 14 and then subsequently activating 116 the DBD igniter 400 to ignite the fuel 14 in the combustion chamber 24. In the seventh operating condition 144, subsequent to injecting 110 the first portion 112 of fuel 14, the DBD igniter 400 is energized 114 to generate a first plurality of free radicals, de-energized a first time and re-energized 114 to generate a second plurality of free radicals, then de-energized a second time and re-energized 114 to generate a third plurality of free radicals, then de-energized a third time and re-energized 114 to generate a fourth plurality of free radicals, according to the method 108 (FIG. 4) to generate four pluralities of free radicals 188 prior to injecting 210 the second portion 212 of the fuel 14 and then subsequently activating 116 the DBD igniter 400 to ignite the fuel 14 in the combustion chamber 24.

In the example shown, energizing of the DBD plasma igniter 400 to generate the free radicals 188 is controlled by a suitable controller (not shown) and/or computational system, e.g., an engine control unit of the vehicle such that the voltage of the electrical field generated during generation of the plurality of free radicals 188 (the energized voltage) is selectively controlled at a predetermined voltage. In the example shown, the energized voltage of the electrical field generated during generation of the plurality of free radicals 188 for each of the fifth, sixth and seventh operating conditions 140, 142, 144 is the same predetermined voltage. In an illustrative example, the energized voltage of the electrical field generated for each of the fifth, sixth and seventh operating conditions 140, 142, 144 is 40 volts.

As shown in FIG. 8 by the comparison of the HRR 130 generated under the first condition 132 and the HRR 130 generated under each of the fifth, sixth and seventh operating conditions 140, 142, 144, the HRR 130 in the combustion chamber 24 can be increased, and the combustion phasing advanced, during the fifth, sixth and seventh operating conditions 140, 142, 144 relative to the first operating condition 132, by energizing 114 the DBD plasma igniter 400 (FIG. 9) to generate one or more pluralities of free radicals 188 after injecting 110 the first portion 112 of fuel 14 and prior to injecting 210 the second portion 212 of the fuel 14 according to the method 108 (FIG. 4) and the protocol 64 (FIG. 5). As such, the addition of generating one or more pluralities of free radicals 188 between the first and second injections 110, 112 of the fuel 14 increases the HRR 130, advances the combustion phasing, and thereby increases the efficiency and effectiveness of combustion within the combustion chamber 24 during operation of the internal combustion engine 10 under the operating conditions 140, 142, 144, relative to operating condition 132, in turn providing improved fuel economy and reduced emissions under operating conditions 140, 142, 144 relative to operating condition 132.

Still referring to FIG. 8, and as shown by the comparison of the HRR 130 generated under each of the fifth, sixth and seventh operating conditions 140, 142, 144, the HRR 130 in the combustion chamber 24 can be increased and combustion phasing can be advanced by increasing the number of times the DBD plasma igniter 400 (FIG. 9) is energized 114 to generate a plurality of free radicals 188 subsequent to injecting 110 the first portion 112 of the fuel 14 and prior to injecting 210 the second portion 212 of the fuel 14, e.g., the HRR 130 in the combustion chamber 24 can be increased by increasing the number of pluralities of free radicals 188 generated in the combustion chamber 24 subsequent to injecting 110 the first portion 112 of the fuel 14 and prior to injecting 210 the second portion 212 of the fuel 14. As shown in FIG. 8, the HRR 130 generated under the seventh operating condition 144 (HRR 130 indicated at 144 in FIG. 8) including generation of four pluralities of free radicals 188 is relatively higher, and shows an advance in combustion phasing, as compared with the HRR 130 generated under the sixth operating condition 142 (HRR 130 indicated at 142 in FIG. 8) including generation of three pluralities of free radicals 188. As further shown in FIG. 8, the HRR 130 generated under the sixth operating condition 142 (HRR 130 indicated at 142 in FIG. 8) including generation of three pluralities of free radicals 188 is relatively higher, and shows an advance in combustion phasing, as compared with the HRR 130 generated under the fifth operating condition 142 (HRR 130 indicated at 142 in FIG. 8) including generation of two pluralities of free radicals 188. As such, increasing the number of pluralities of free radicals 188 subsequent to injecting 110 the first portion 112 of the fuel 14 and prior to injecting 210 the second portion 212 of the fuel 14 using the method 108 thereby increases the efficiency and effectiveness of combustion within the combustion chamber 24 during operation of the internal combustion engine 10 under the seventh operating condition 144, relative to sixth operating condition 142, relative to the fifth operating condition 140, relative to the first operating condition 132, in turn providing for improved fuel economy and reduced emissions under operating conditions 140, 142, 144 with increasing numbers of pluralities of free radicals 188 generated relative to operating condition 132.

The use of first, second, third, fourth, fifth, sixth and seventh operating conditions 132, 134, 136, 138, 140, 142, 144 is for illustrative purposes to, for example, illustrate the effect of relative differences between the respective operating conditions on the HRR 130 generated during use of the method 108 to control ignition of the fuel 14 in the combustion chamber 24, and the effect of relative differences on combustion phasing, and is not intended to be limiting. For example, it would be understood that additional operating conditions other than the illustrative examples described herein can be executed using the method 108, by varying, for example, the type of plasma igniter 100, 300, 400 used, the duration of each energizing and activation event, the energizing voltage of the electric field generated by the generation of the plurality of free radicals 188, where the energizing voltage may be different for each plurality of free radicals 188 generated during execution of the method 108, the number of pluralities of free radicals 188 generated during execution of the method 108, etc., to provide a method 108 which increases the efficiency and effectiveness of combustion within the combustion chamber 24. By way of illustrative example, the duration of an energizing event can be between 0.1 milliseconds (ms) and 5 ms. By way of illustrative example, the duration of an activation event can be between 0.1 ms and 5 ms.

Figure 13:
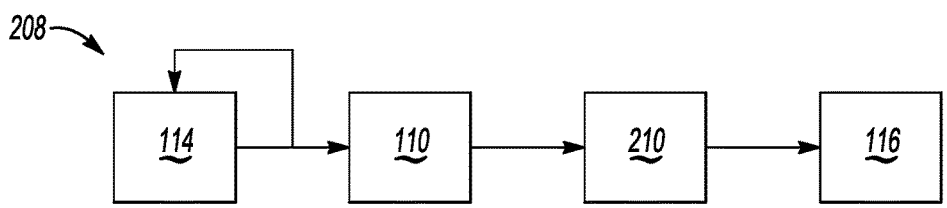
FIG. 13 is a schematic flowchart of a second method of igniting a fuel within the combustion chamber of FIG. 1.
Figure 15:
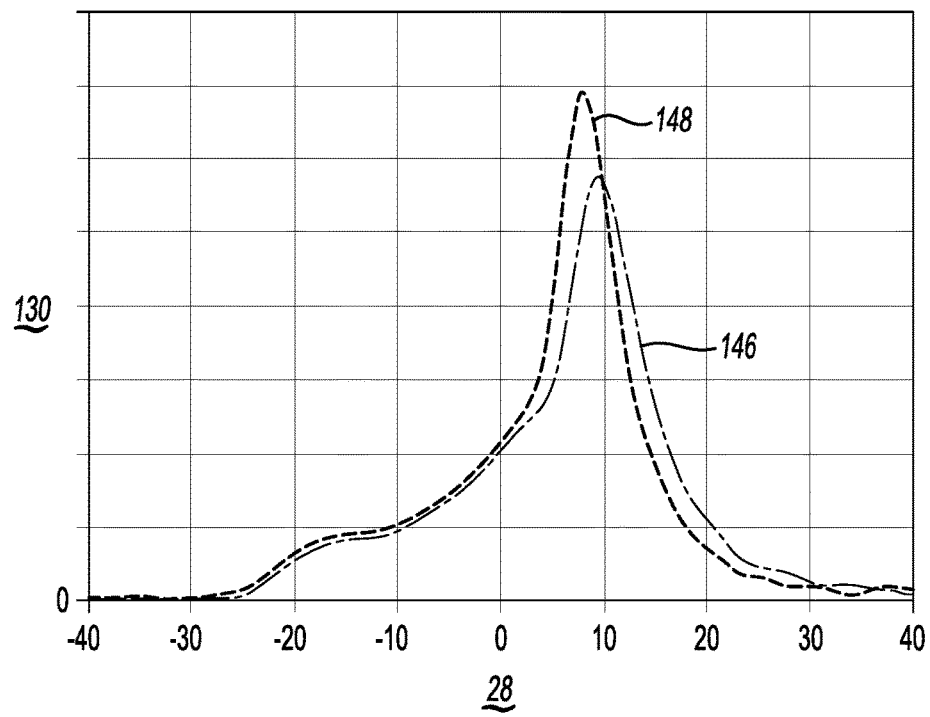
FIG. 15 is a schematic illustration of a relationship between heat release rate (HRR) as measured in Joules per crank angle degree (J/CAD), within the combustion chamber of FIG. 9 and rotational position as measured in angular degrees, of a piston disposed within the combustion chamber during the second example operating condition shown in FIG. 14, with and without radical generation.

Referring now to FIGS. 13, 14 and 15, FIG. 13 shows a second method 208 of igniting a fuel 14 within the combustion chamber 24 of FIG. 1 and which is illustrated by the protocol 164 shown in FIG. 14. Referring now to FIG. 14, a method 208 of igniting the fuel 14 within the combustion chamber 24 is disclosed. The method 208 includes energizing 114 the plasma igniter 100 within the combustion chamber 24 to generate one or more pluralities of free radicals 188. Such energizing 114 may likewise be controlled by a suitable controller (not shown) and/or computational system, e.g., an engine control unit of the vehicle. The method 208 can include energizing 114 the plasma igniter 100 to generate a first plurality of free radicals 188, and subsequently de-energizing and re-energizing 114 the plasma igniter 100 one or more times to generate one or more subsequent pluralities of free radicals 188. As indicated in FIGS. 13 and 14, energizing 114 and subsequent de-energizing and re-energizing 114 of the plasma igniter 100 occurs prior to injecting 110 the first portion 112 of the fuel 14, which occurs prior to injecting 210 the second portion 212 of the fuel 14. For example, as shown in protocol 164 in FIG. 14, the plasma igniter 100 can be initially energized 114 when the crankshaft 12 has the rotational position 28 of from about −320 degrees to about −280 degrees, or at about −300 degrees to generate a first plurality of free radicals 188 in the combustion chamber 24. As shown in method 208 (FIG. 13) and protocol 164 in FIG. 14, the plasma igniter 100 can then subsequently be de-energized and re-energized 114 when the crankshaft 12 has the rotational position 28 of from about −250 degrees to about −210 degrees, or at about −230 degrees to generate a second plurality of free radicals 188.

Referring again to FIGS. 13 and 14, the method 208 includes injecting 110 a first portion 112 (FIG. 14) of the fuel 14 into the combustion chamber 24 after energizing 114 the plasma igniter 100 to generate one or more pluralities of free radicals 188 in the combustion chamber 24. That is, injecting 110 may include ejecting the first portion 112 from the fuel nozzle 68 in a desired quantity and/or at a desired rotational position 28 of the crankshaft 12. The quantity and timing of such injection may be controlled by a suitable controller (not shown) and/or computational system, e.g., an engine control unit of the vehicle.

Both the quantity of the first portion 112 and the timing of injecting 110 the first portion 112 may be selected according to the desired characteristics of a mixture of the intake air 40 and fuel 14 within the combustion chamber 24; the valve protocol 164; and/or the operating condition of the internal combustion engine 10. For example, the first portion 112 may be from about 1 mg to about 20 mg of fuel 14, or from about 3 mg to about 15 mg of fuel 14, or from about 9 mg to about 13 mg of fuel 14, or about 10.5 mg of fuel 14. Further, injecting 110 may occur at any desired rotational position 28 of the crankshaft 12. In a non-limiting example described with reference to FIG. 14, the fuel nozzle 68 may inject the first portion 112 of the fuel 14 into the combustion chamber 24 when the crankshaft 12 has the rotational position 28 of from about −210 degrees to about −190 degrees in the example shown in FIG. 14, the fuel nozzle 68 injects the first portion 112 of the fuel 14 into the combustion chamber 24 when the crankshaft 12 has the rotational position 28 of at or about −200 degrees. As described with reference to FIGS. 13 and 14, the method 208 may also include injecting 210 a second portion 212 of the fuel 14 into the combustion chamber 24 after energizing 114 the plasma igniter 100 one or more times to generate one or more pluralities of free radicals 188 in the combustion chamber 24, after injecting 110 the first portion 112 of fuel 14 into the combustion chamber 24, and prior to activating 116 the plasma igniter 100 to ignite the fuel 14 in the combustion chamber 24. Injecting 210 may include ejecting the second portion 212 from the fuel nozzle 68 after injection of the first portion 112 in a desired quantity and/or at a desired rotational position 28 of the crankshaft 12. Therefore, the first portion 112 and the second portion 212 are injected into the combustion chamber 24 separately and represent unique or distinct fuel-injection events. Stated differently, the method 108 may include multiple injections of fuel 14.

Both the quantity of the second portion 212 and the timing of injecting 210 the second portion 212 may be selected according to the desired characteristics of the mixture of the intake air 40 and fuel 14 within the combustion chamber 24; the valve protocol 164, and/or the operating condition of the internal combustion engine 10. As shown in FIG. 14, the event of activating 116 the plasma igniter 100 to ignite the fuel 14 is closely coupled to the second injection event 210 of the second portion 212 of fuel 14 into the combustion chamber 24, that is, injecting 210 and activating 116 occur in close time proximity and under similar cranking conditions. In one example, the events of injecting 210 the second fuel portion 212 and activating 116 the plasma igniter 100 occur within 6 crank angle degrees of each other, and preferably within a range of 2 to 4 crank angle degrees from each other. By way of example, FIG. 14 shows fuel injection event 210 occurring at a crank angle of −33 degrees and igniter activation event 116 occurring at a crank angle of −27 degrees.

Further, the second portion 212 may be less than, equal to, or greater than the first portion 112. For example, the second portion 212 may be from about 1 mg to about 20 mg of fuel 14, or from about 5 mg to about 15 mg of fuel 14, or about 10.5 mg of fuel 14. Further, injecting 210 may occur at any desired rotational position 28 of the crankshaft 12. As non-limiting examples, the fuel nozzle 68 may inject the second portion 212 of the fuel 14 into the combustion chamber 24 when the crankshaft 12 has the rotational position 28 of from about −90 degrees to about 0 degrees, or from about −60 degrees to about −20 degrees. In the example shown in FIG. 14, the fuel nozzle 68 injects the second portion 212 of the fuel 14 into the combustion chamber 24 when the crankshaft 12 has the rotational position 28 of at or about −33 degrees. The second injection may also be controlled by a suitable controller (not shown) and/or computational system, e.g., the engine control unit of the vehicle. Therefore, the first portion 112 and the second portion 212 may be injected into the combustion chamber 24 separately and may represent unique or distinct fuel-injection events. In the example shown in FIG. 14 and method 208, the first portion 112 and the second portion 212 of the fuel 14 is injected 110, 210 into the combustion chamber 24 prior to activating 116 the plasma injector 100 to ignite the fuel 14 in the combustion chamber 24.

Referring again to FIGS. 13 and 14, the method 208 also includes, after energizing 114 the plasma igniter 100 to generate one or more pluralities of free radicals 188, and after subsequently injecting 110, 210 the first and second portions 112, 212 of the fuel 14, activating 116 the igniter 100 within the combustion chamber 24 to thereby ignite the fuel 14. Activating 116 the plasma igniter 100, which may be, for example, the corona discharge plasma igniter 300, or the DBD plasma igniter 400 as set forth above, initiates the flame 102 within the combustion chamber 24 and thereby ignites the fuel 14. Therefore, the method 208 can include multiple plasma ignition events, and such plasma ignition events, i.e., energizing 114 and activating 116, may be controlled by a suitable controller (not shown) and/or computational system, e.g., an engine control unit of a vehicle containing the engine 10. In the example illustrated by FIGS. 13 and 14, activating 116 occurs subsequent to energizing 114 the plasma igniter 100 and subsequent to injecting 110, 210 the first and second portions 112, 212 of the fuel 14 into the combustion chamber 24. For example, the igniter 100 may be activated when the crankshaft 12 has the rotational position 28 of from about −30 degrees to about 0 degrees, or at or about −27 degrees.

Therefore, the method 208 allows for multiple ignition events, i.e., energizing 114, de-energizing and re-energizing 114, activating 116 by the plasma igniter 100 in the combustion chamber 24. Additionally, the method 208 allows for multiple fuel-injection events, i.e., injecting 110 the first portion 112 and injecting 210 the second portion 212 to optimize combustion of the fuel 14 within the combustion chamber 24 and thereby optimize operation and performance of the internal combustion engine 10. Therefore, the method 208 also allows for precise control and customization of a specific quality, timing, and/or duration of flame initiation within the combustion chamber 24 in relation to the quantity, timing, and/or duration of generating one or more pluralities of free radicals 188 within the combustion chamber 24 and injecting multiple portions 112, 212 of the fuel 14 into the combustion chamber 24.

The method 208 may be suitable for use with both the positive valve overlap (PVO) valve protocol 164 (FIG. 14) and a negative valve overlap (NVO) valve protocol (not shown) for operating the internal combustion engine 10. In particular, for each of the PVO valve protocol 164 and the NVO valve protocol, the method 208 includes, during the intake stroke 54 of the piston 22, energizing the plasma igniter 100 to generate a first plurality of free radicals 188 in the combustion chamber 24, de-energizing the plasma igniter 100, re-energizing the plasma igniter 100 to generate a second plurality of free radicals 188, de-energizing the plasma igniter 100, and translating 120 (FIG. 5) the intake valve 34 from the seated position 42 to the unseated position 44. Further, the method 208 includes, during the compression stroke 56 of the piston 22 and after translating 120 the intake valve 34 to the seated position 42, injecting 110 the first portion 112 of the fuel 14 into the combustion chamber 24, then injecting 210 the second portion 212 of the fuel 14 into the combustion chamber 24, and subsequently activating the plasma igniter 100 to ignite the fuel 14 in the combustion chamber 24.

Referring now to FIG. 15, shown is a schematic illustration of a relationship between a HRR 130 within the combustion chamber 24, as measured in Joules per crank angle degree (J/CAD), and the rotational position 28 measured in angular degrees of the piston 22 disposed within the combustion chamber 24, where the plasma igniter 100 is configured as a dielectric barrier discharge (DBD) plasma igniter 400 as shown in FIG. 9. In the example shown in FIG. 15, the engine 10 is operated using method 208 under a first operating condition 146 and under a second operating condition 148, to generate HRRs 130 indicated respectively in FIG. 15 at 146, 148. During the first operating condition 146, the method used for igniting the fuel 14 the combustion chamber includes injecting 110 a first portion 112 of the fuel 14, injecting 210 a second portion 212 of the fuel 14, and activating 116 the DBD plasma igniter 400 to ignite the fuel 14 in the combustion chamber 24 as described for the protocol 164 shown in FIG. 14. However, during the first operating condition 146, the DBD plasma igniter 400 is not energized 114, and as such, does not generate any free radicals 188 in the combustion chamber 24 prior to injecting 110, 210 the first and second portions 112, 212 of the fuel 14 and prior to being activated 116 to ignite the fuel 14 in the chamber 24 to generate the HRR 130 for the first operating condition (identified at 146 in FIG. 15).

During the second operating condition 148, the method 208 shown in FIG. 13 and protocol 164 shown in FIG. 14 is used to ignite the fuel 14 in the combustion chamber 24 to generate the HRR 130 identified at 148 in FIG. 15. That is, the second operating condition 148 includes energizing 114 the DBD plasma igniter 400 to generate a first plurality of free radicals 188 in the combustion chamber 24, subsequently de-energizing and re-energizing 114 the DBD plasma igniter 400 to generate a second plurality of free radicals 188 in the combustion chamber 24, subsequently injecting 110 a first portion 112 of fuel 14 into the combustion chamber 24, subsequently injecting 210 a second portion 212 of the fuel 14, and subsequently activating 116 the DBD plasma igniter 400 to ignite the fuel 14 in the combustion chamber to generate a HRR 130 depicted at 148 in FIG. 15. In the example shown, energizing of the DBD plasma igniter 400 to generate the free radicals 188 is controlled by a suitable controller (not shown) and/or computational system, e.g., an engine control unit of the vehicle such that the voltage of the electrical field generated during generation of the plurality of free radicals 188 (the energized voltage) can be a predetermined voltage. In a non-limiting example, the electrical field generated during energizing 114 of the DBD plasma igniter 400 during operating condition 148 corresponding to method 208 (FIG. 13) and protocol 164 (FIG. 14) is characterized by an energized voltage of 50 volts (V).

Still referring to FIG. 15, and as shown by the comparison of the HRR 130 generated under the first and second conditions 146, 148, the HRR 130 in the combustion chamber 24 can be increased, and combustion phasing advanced, during the second operating condition 148 relative to the first operating condition 146, by generating one or more pluralities of free radicals 188 prior to injecting 110 the first portion 112 of fuel 14 and prior to injecting 210 the second portion 212 of the fuel 14 according to the protocol 164 shown in FIG. 14. As such, the addition of generating one or more pluralities of free radicals 188 prior to the first and second injections 110, 112 of the fuel 14 increases the HRR 130, advances combustion phasing, and thereby increases the efficiency and effectiveness of combustion within the combustion chamber 24 during operation of the internal combustion engine 10 under the operating condition 148, relative to operating condition 146, in turn providing for improved fuel economy and reduced emissions under operating condition 148 relative to operating condition 146.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of igniting a fuel within a combustion chamber defined by a cylinder block of an internal combustion engine, the method comprising:
   injecting, via a fuel nozzle, a first portion of the fuel into the combustion chamber;
   wherein the fuel nozzle extends through a cylinder head mated to the cylinder block and protrudes into the combustion chamber;
   wherein a plasma igniter extends through the cylinder head mated to the cylinder block and protrudes into the combustion chamber;
   wherein a controller is operatively connected to each of the internal combustion engine, the fuel nozzle, and the plasma igniter, and is configured to control combustion phasing of the engine;
   wherein the plasma igniter is configured such that:
      energizing the plasma igniter, via the controller, generates a plurality of free radicals within the combustion chamber; and
      activating the plasma igniter, via the controller, initiates a flame within the combustion chamber to ignite the fuel in the combustion chamber;
   the method further comprising:
      after injecting the first portion of the fuel, energizing the plasma igniter via the controller, to generate a first plurality of free radicals of the plurality of free radicals;
      after generating the first plurality of free radicals and prior to injecting a second portion of the fuel, de-energizing the plasma igniter, via the controller, and subsequently re-energizing the plasma igniter, via the controller, to generate a second plurality of free radicals of the plurality of free radicals within the combustion chamber;

after generating the second plurality of free radicals, injecting, via the fuel nozzle, the second portion of the fuel into the combustion chamber; and after injecting the second portion of fuel, via the fuel nozzle, activating the plasma igniter, via the controller, to thereby ignite the fuel.

2. The method of claim 1, wherein injecting the first portion and subsequently generating the first plurality of free radicals occurs during an intake stroke of a piston disposed within the combustion chamber in which the piston travels from a first position to a second position within the combustion chamber.

3. The method of claim 2, wherein generating the second plurality of free radicals and subsequently injecting the second portion occurs during a compression stroke of the piston in which the piston travels from the second position to the first position within the combustion chamber.

4. The method of claim 1, further comprising:
after generating the second plurality of free radicals and prior to injecting the second portion, de-energizing and subsequently re-energizing the plasma igniter, via the controller, to generate a third plurality of free radicals within the combustion chamber.

5. The method of claim 4, further comprising:
after generating the third plurality of free radicals and prior to injecting the second portion, de-energizing and subsequently re-energizing the plasma igniter, via the controller, to generate at least a fourth plurality of free radicals within the combustion chamber.

6. The method of claim 1, wherein the plasma igniter is a corona discharge plasma igniter configured for discharging a plasma having a plurality of streamers into the combustion chamber.

7. The method of claim 1, wherein the plasma igniter is a dielectric-barrier-discharge plasma igniter configured for at least one of discharging a plasma having a plurality of streamers into the combustion chamber and discharging a plasma having a plurality of streamers propagating along a surface of a firing portion of the dielectric-barrier-discharge plasma igniter.

8. The method of claim 7, wherein energizing the plasma igniter further comprises energizing the plasma igniter to generate an electrical field having a voltage between 10 kV and 110 kV.

9. A method of igniting a fuel within a combustion chamber defined by a cylinder block of an internal combustion engine, the method comprising:
energizing a plasma igniter, via a controller, to generate a first plurality of free radicals within the combustion chamber;
wherein the controller is operatively connected to each of the internal combustion engine, the plasma igniter, and a fuel nozzle, and is configured to control combustion phasing of the engine;
wherein the fuel nozzle extends through a cylinder head mated to the cylinder block and protrudes into the combustion chamber;
wherein the plasma igniter extends through the cylinder head mated to the cylinder block and protrudes into the combustion chamber;

wherein the plasma igniter is configured such that:
energizing the plasma igniter, via the controller, generates a plurality of free radicals within the combustion chamber; and
activating the plasma igniter, via the controller, initiates a flame within the combustion chamber to ignite the fuel in the chamber;

the method further comprising:
de-energizing the plasma igniter via the controller, and subsequently re-energizing the plasma igniter, via the controller, to generate a second plurality of free radicals;
after generating the second plurality of free radicals, injecting, via the fuel nozzle, a first portion of the fuel into the combustion chamber;
after injecting the first portion, injecting, via the fuel nozzle, a second portion of the fuel into the combustion chamber;
after injecting the second portion, activating, via the controller, the plasma igniter to thereby ignite the fuel.

10. The method of claim 9, wherein generating the first and second pluralities of free radicals occurs during an intake stroke of a piston disposed within the combustion chamber in which the piston travels from a first position to a second position within the combustion chamber.

11. The method of claim 10, wherein injecting the first portion occurs at completion of the intake stroke and initiation of a compression stroke of the piston in which the piston travels from the second position to the first position within the combustion chamber.

12. The method of claim 11, wherein injecting the second portion occurs during the compression stroke of the piston.

13. The method of claim 11, wherein:
generating the first plurality of free radicals occurs when a crankshaft attached to the piston is at a first rotational position;
generating the second plurality of free radicals occurs when the crankshaft is at a second rotational position; and
wherein a rotational difference between the first and second rotational positions is between 25 degrees and 150 degrees.

14. An internal combustion engine comprising:
a cylinder block defining a combustion chamber therein;
a cylinder head mated to the cylinder block such that the cylinder head covers the combustion chamber;
a fuel nozzle configured for injecting a fuel into the combustion chamber;
wherein the fuel nozzle extends through the cylinder head and protrudes into the combustion chamber;
a plasma igniter extending through the cylinder head and protruding into the combustion chamber;
a controller is operatively connected to each of the internal combustion engine, the fuel nozzle, and the plasma igniter, and is configured to control combustion phasing of the engine;
wherein the plasma igniter is configured to generate a plurality of free radicals within the combustion chamber when energized, via the controller, and for initiating a flame for igniting the fuel within the combustion chamber when activated via the controller;
wherein the fuel is ignited within the combustion chamber by:
injecting a first portion of the fuel, via the fuel nozzle, into the combustion chamber;

after injecting the first portion of the fuel, selectively energizing the plasma igniter via the controller, to generate a first plurality of free radicals;

after generating the first plurality of free radicals and prior to injecting a second portion of the fuel, de-energizing the plasma igniter via the controller, and subsequently re-energizing the plasma igniter via the controller, to generate a second plurality of free radicals within the combustion chamber;

after generating the second plurality of free radicals, injecting via the fuel nozzle, the second portion of the fuel into the combustion chamber; and after injecting the second portion of fuel via the fuel nozzle, activating the plasma igniter via the controller, to thereby ignite the fuel.

15. The internal combustion engine of claim 14, wherein the plasma igniter is configured to be selectively energized to generate an electrical field having a voltage between 10 kV and 110 kV.

16. The internal combustion engine of claim 15, wherein the controller is configured to control combustion phasing of the engine by at least one of:

selectively energizing the plasma igniter to generate at least the second plurality of free radicals such that combustion phasing is advanced; and selectively energizing the plasma igniter to generate an electrical field having a predetermined voltage, wherein advancement of the combustion phasing is defined by the predetermined voltage.

17. The internal combustion engine of claim 14, wherein the plasma igniter is a dielectric-barrier-discharge (DBD) plasma igniter comprising:

an igniter body having a shank extending into the combustion chamber; and a central electrode extending from the shank into the combustion chamber to define a firing portion;

wherein the shank is made from a dielectric material; and wherein the firing portion includes at least one firing prong defined by the central electrode.

18. The internal combustion engine of claim 17, wherein the DBD plasma igniter includes a dielectric casing fully encapsulating the firing portion.

19. The internal combustion engine of claim 17, wherein the DBD plasma igniter includes a generally cylindrical ground electrode defining a discharge cavity surrounding the central electrode.

20. The internal combustion engine of claim 14, wherein the plasma igniter is a corona discharge plasma igniter configured to discharge a plasma having a plurality of streamers into the combustion chamber.

* * * * *